(12) United States Patent
Höhn

(10) Patent No.: US 11,781,619 B2
(45) Date of Patent: Oct. 10, 2023

(54) PLANETARY TRANSMISSION

(71) Applicant: HÖHN GMBH, Gräfelfing (DE)

(72) Inventor: Bernd-Robert Höhn, Munich (DE)

(73) Assignee: HÖHN GMBH, Gräfelfing (DE)

( * ) Notice: Subject to any disclaimer, the term of this patent is extended or adjusted under 35 U.S.C. 154(b) by 0 days.

(21) Appl. No.: 17/918,952

(22) PCT Filed: Apr. 20, 2021

(86) PCT No.: PCT/EP2021/060277
§ 371 (c)(1),
(2) Date: Oct. 14, 2022

(87) PCT Pub. No.: WO2021/214085
PCT Pub. Date: Oct. 28, 2021

(65) Prior Publication Data
US 2023/0235812 A1     Jul. 27, 2023

(30) Foreign Application Priority Data

Apr. 22, 2020  (DE) ...................... 10 2020 111 001.4
Apr. 22, 2020  (DE) ...................... 10 2020 111 004.9

(51) Int. Cl.
*F16H 57/08* (2006.01)
*F16H 1/28* (2006.01)

(52) U.S. Cl.
CPC .............. *F16H 1/28* (2013.01); *F16H 57/08* (2013.01); *F16H 2057/085* (2013.01)

(58) Field of Classification Search
CPC ....... F16H 1/28; F16H 57/08; F16H 2057/085
See application file for complete search history.

(56) References Cited

U.S. PATENT DOCUMENTS

| 3,675,510 A | 7/1972 | Duggar, Jr. |
| 4,452,102 A | 6/1984 | Shaffer |

(Continued)

FOREIGN PATENT DOCUMENTS

| CH | 257825 A | 10/1948 | |
| CH | 713240 A2 * | 6/2018 | .............. F16C 19/28 |

(Continued)

OTHER PUBLICATIONS

English translation of Office Action from the German Patent Office dated Jan. 28, 2021 in related DE application No. 10 2020 111 001.4.

(Continued)

*Primary Examiner* — Justin Holmes
(74) *Attorney, Agent, or Firm* — J-TEK LAW PLLC; Jeffrey D. Tekanic; Scott T. Wakeman

(57) ABSTRACT

A planetary transmission (2) includes a stepped planetary gear (24), or planetary gears, which are connected to each other, that is/are disposed radially between a first shaft (6) and axially-adjacent first and second ring gears (12, 16). The stepped planetary gear, or connected planetary gears, include(s) a first gearing region (26) that meshes with a sun gear (8) on the first shaft (6) and the first ring gear (12), as well as a helically-toothed second gearing region (28) that meshes with the second ring gear (16). A cylindrical support region (32) is coaxially provided on/around the first shaft. The stepped planetary gear or the connected planetary gears is/are supported on the cylindrical support region of the first shaft by the outer circumferential surface of the second gearing region. The second gearing region lies on the addendum circle of the second gearing region.

21 Claims, 9 Drawing Sheets

(56) References Cited

U.S. PATENT DOCUMENTS

| | | | |
|---|---|---|---|
| 5,807,205 A | | 9/1998 | Odaka et al. |
| 2008/0045374 A1 | | 2/2008 | Weinberg et al. |
| 2012/0220418 A1 | | 8/2012 | Frank |
| 2017/0067539 A1 | * | 3/2017 | Matsumoto .............. F16H 1/36 |

FOREIGN PATENT DOCUMENTS

| | | |
|---|---|---|
| DE | 2346067 A1 | 3/1975 |
| DE | 102008035114 A1 | 2/2010 |
| DE | 102009049271 A1 | 4/2011 |
| DE | 102010012879 A1 | 9/2011 |
| DE | 102010018528 A1 | 10/2011 |
| DE | 202009018547 U1 | 1/2012 |
| DE | 102011114656 A1 | 4/2013 |
| DE | 102017129588 A1 | 6/2019 |
| EP | 0559626 A1 | 9/1993 |
| EP | 1174641 A1 | 1/2002 |

OTHER PUBLICATIONS

Office Action from the Japanese Patent Office dated Mar. 14, 2023 in related application No. 2022-563965, and translation thereof.
Notice of Allowance from the Japanese Patent Office dispatched May 30, 2023 in related application No. 2022-563965, and translation thereof.
English translation of the Written Opinion of the International Searching Authority in parent application No. PCT/EP2021/060277.
English translation the International Search Report dispatched Oct. 28, 2021 in parent application No. PCT/EP2021/060277.

* cited by examiner

PLANETARY TRANSMISSION

CROSS-REFERENCE

This application is the U.S. national stage of International Application No. PCT/EP2021/060277 filed on Apr. 20, 2021, which claims priority to German patent application no. 10 2020 111 001.4 filed on Apr. 20, 2020, and to German patent application no. 10 2020 111 004.9 filed on Apr. 20, 2020.

TECHNICAL FIELD

The present disclosure relates to a planetary transmission. In particular, a planetary transmission is disclosed in which forces and torques that arise during torque transmission in the various tooth engagements are advantageously supported. In particular, a Wolfrom planetary transmission is disclosed.

RELATED ART

Wolfrom planetary transmissions make possible the realization of high gear ratios with simultaneously few tooth engagements. The number of components used in a compact design can thereby be reduced compared to other transmission designs having similar gear ratios. At the same time, there is a small transmission backlash and high efficiency.

Conventional Wolfrom planetary transmissions are designed as follows: a sun gear provided on an input shaft is disposed, coaxial with and with (at) a radial distance (spacing) to, within a first ring gear that is provided in a housing-fixed manner. Between the sun gear and the first ring gear, one or more first planetary gears is/are provided that mesh(es) with the sun gear and the first ring gear, and during rotation of the sun gear, revolve(s) (orbit(s)) about the axis of rotation of the input shaft or of the sun gear in addition to rotating about its/their own axis. Furthermore, one or more second planetary gears is/are respectively rigidly connected to one of the first planetary gear or planetary gears; the one or more second planetary gears are surrounded by a further ring gear and mesh therewith. Alternatively thereto, a stepped planetary gear having two gearing regions, which are disposed offset axially (along the rotational axis) or one-behind-the-other and are configured for engaging with the different ring gears, is used. The further ring gear serves as the output, and can be connected, for example, to an output shaft. The planetary gears (or the stepped planetary gear) are (is) typically supported on a common planet carrier that can be supported on the input shaft or on the output shaft or in the housing.

During power transmission, forces (in particular, the counteracting circumferential forces of the two ring gears) act via the tooth engagements of the planetary gears, which forces result inter alia in tilting moments perpendicular to the rotational axis of the planetary gears. There is therefore the need to support the planetary gears perpendicular to their rotational axis (against the tilting moments). For this purpose, a planet carrier, which is rotatably supported about the rotational axis of the input shaft or of the sun gear and includes projecting bearing journals for supporting the planetary gears, is conventionally provided.

Examples of known Wolfrom planetary transmissions are disclosed, e.g., in DE 20 2009 018 547 U1 (and its family member, US 2012/0220418) und CH 257 825 A. Additional planetary transmissions are known from DE 10 2011 114656 A1 und DE 10 2010 018528 A1.

SUMMARY

One non-limiting object underlying the present teachings is to disclose techniques for improving a planetary transmission such that it may have one or more of, e.g., high efficiency, little backlash, a compact design and/or a small number of components.

Forces, which act on the planetary gears, which are connected to each other, or on the stepped planetary gear, are also the radial forces of the tooth engagements of the two ring gears with the respective planetary gear (planetary gears, which are connected to each other, or the stepped planetary gear). These forces act in the same direction on the center point of the Wolfrom gear set. Furthermore, a radial force also arises from the sun-planetary gear tooth engagement. This radial force acts counter to the radial forces of the two outer planetary-gear tooth engagements—first ring gear and planetary gear—of the second ring gear, but is much weaker. This radial force results (is obtained) from the calculation of the torques of the Wolfrom gear set, for example, according to Herbert W. Müller, Die Umlaufrädergetriebe, second edition 1998, Springer Verlag. According to embodiments disclosed in the present disclosure, the resulting radial force, which is typically supported by a planet carrier in conventional transmissions, is preferably at least partially, still more preferably completely, supported on a cylindrical support region via the outer-circumferential surface of a second gearing region, as will be further explained below.

Thus, in one aspect of the present teachings, the planetary gears, which are connected to each other, or the stepped planetary gear are/is thus on the one hand radially supported between a first ring gear and a sun gear, but with a certain amount of backlash (clearance, play) that is required for a smooth running gearing. The supporting (contact, bearing) of the second gearing region on the cylindrical support region, creates a second radial supporting of the stepped planetary gear or of the planetary gears that are connected to each other, which can have little backlash (or can even be essentially backlash-free) compared to a first radial supporting. The planetary gears, which are connected to each other, or the stepped planetary gear are/is thus preferably radially supported at four points along their/its planetary rotational axis. In particular, due to the supporting (contact, bearing) on the cylindrical support region, it can be ensured that a torque, which acts perpendicular to the planetary rotational axis, can be well supported on the planetary gears, which are connected to each other, or on the stepped planetary gear. In particular, twistings or a misalignment of the planetary rotational axis (second axis) of the connected planetary gears or of the stepped planetary gear with respect to the rotational axis (first axis) of the sun gear can thereby be avoided or reduced, whereby the efficiency increases.

In one alternative design, the supporting (contact, bearing) can be effected by a cylindrical outer circumferential surface that is configured, for example, as a cylindrical sleeve, which is placed-on, for example, pressed-on, a portion of the gearing of the second gearing region, thereby enabling the above-mentioned advantageous supporting in the radial direction. In this alternative design, the second gearing region can be helically- or straight-toothed. Instead of a sleeve, a cylindrical outer circumferential surface that is supported on the support surface can also be directly formed on the stepped planetary gear or on the planetary gears, which are connected to each other. In such embodiments it is preferred that the outer circumference is closed. The cross-section of the outer circumferential surface perpendicular to the rotational axis is preferably circular.

According to one presently preferred aspect of the present disclosure, the tooth profile of the second gearing region is helically toothed and is preferably configured such that the outer circumferential surface, which lies in (or defines) the addendum circle, of the individual teeth is supported directly on (i.e. directly contacts, bears) the cylindrical support region, independently of the (i.e. at every) rotational position of the second gearing region. Furthermore, the second gearing region is preferably configured such that, during rotation of the internal components of the transmission, at least a point contact, preferably a line contact, is continuously present between the cylindrical support region and the second gearing region. An internal gearing of the second ring gear is also helically toothed in correspondence with (i.e. matching) the second gearing region. In such an embodiment, preferably no cylindrical outer-circumferential surface or sleeve as are described above is provided.

The first gearing region can be formed straight toothed or helically toothed. The gearings of the sun gear and of the first ring gear are correspondingly configured.

As is common, the addendum circle (or tip circle) of the second gearing region is the outer circumferential circle of the second gearing region. In other words, the addendum circle coincides with, or traces (describes) a virtual circle that intersects, the tops of the teeth of the second gearing region (segment). In particular, in an embodiment in which the second gearing region is supported directly on (directly contacts, bears) the cylindrical support region, a tooth shape having a flattened tooth head (blunt gearing) is preferably used. This ensures that a line contact (not point contact) is present between the second gearing region and the cylindrical support region. Additional factors are the head width, the pitch, the helix angle, which are to be tuned to one another.

The housing can be formed integrally or can be formed from a plurality of components. The housing can be part of another housing or component or another device. The first shaft (for example, an input shaft) can be formed in a one-piece or multi-piece manner. The sun gear can be formed integrally with the first shaft, or can be detachably or non-detachably attached to the first shaft. The first ring gear can be formed integrally in the housing, or can be detachably or non-detachably attached or affixed thereto. The second ring gear can be supported (borne) in the housing on the radially outer side, or on the first shaft on the radially inner side. The second ring gear can be connected to a second shaft in a torque-proof manner to rotate therewith, or can be provided directly itself as the output component. The second ring gear can be formed integrally with a second shaft, or can be connected to the second shaft via an at least partially radially extending region (segment). The second shaft itself can be supported and the second ring gear can be supported by (on) the second shaft, and vice versa. The second shaft is preferably formed on a side opposite the first shaft. Alternatively both the first and second shafts can be formed on the same side. In both cases, the second shaft is preferably formed at least partially as a hollow shaft, inside which the first shaft is guided and is preferably supported.

The planetary transmission (e.g., a Wolfrom planetary transmission) is preferably configured either with the stepped planetary gear or with the two planetary gears connected to each other in a torque-proof manner to rotate together. The planetary gears can be detachably or non-detachably connected to one another. A stepped planetary gear or connected planetary gears preferably differs only in the manufacturing method of the respective components. No differences result for the operation of the planetary transmission. The stepped planetary gear can be formed integrally from a component on which the different gearing regions are provided one-behind-the-other in the axial direction, for example by machining, or by non-detachably or detachably attaching of the gearing regions. Alternatively each of the gearing regions is formed by one planetary gear each. The first gearing region is formed axially offset from the second gearing region. The gearing regions rotate about a common planetary axis. The planetary axis revolves (orbits) about the first axis simultaneously with the rotation of the planetary gears or of the stepped planetary gear about the planetary axis that is parallel to the first axis.

The cylindrical support region can be formed integrally, or detachably or non-detachably, preferably rigidly, connected to the first shaft. The cylindrical support region or only the surface thereof can have a greater tempering and/or hardness. The cylindrical support region can rotate with the first shaft or can at least be supported (borne) thereon. The cylindrical support region can alternatively be supported on the first shaft to be rotatable about it. The cross-sectional shape of the outer circumferential surface perpendicular to the rotational axis of the first shaft is preferably circular.

The first shaft is preferably the input shaft, via which a torque is introduced into the transmission. The first shaft can be supported in or on a second shaft that is preferably the output shaft, or vice versa. Alternatively the first shaft can also be supported exclusively in the housing.

When the outer diameter of the cylindrical support region and the diameter of the addendum circle of the helically toothed second gearing region supported directly on the cylindrical support region each match the operating pitch circle diameter of the gearing between the first gearing region and the sun gear, the helically toothed second gearing region can roll on the cylindrical support region, preferably without friction. Thus there is preferably no sliding (slippage) in (at) the support point between the second gearing region and the cylindrical support region. This radial supporting thereby functions essentially without losses.

If a face contact ratio $\varepsilon\beta$ of the helically toothed second gearing region, which is supported (borne) directly on the cylindrical support region, is preferably equal to one or is preferably greater than one, it is ensured that, independent of the (i.e. at every) rotational position of the second gearing region, a portion of the tooth head lying on the addendum circle is always in point- or line-contact with the cylindrical support surface. The support region therefore cannot enter into the depressions (recesses) between each two adjacent ones of the tooth heads. A jolting in the bearing assembly is thus precluded, which would necessarily be the case with the design of the gearing as a straight gearing.

If the face contact ratio $\varepsilon\beta$ of the helically toothed second gearing region, which is directly supported (borne) on the support region, of the at least one planetary gear is less than one but greater than or equal to the ratio of the pitch p minus the tooth-head width of the second gearing region to the pitch p of the second gearing region, it can also be ensured that, independent of the (i.e. at every) rotational position of the second gearing region, a portion of the tooth head lying on the addendum circle is always in point- or line-contact with the cylindrical support surface. When the face contact ratio $\varepsilon\beta$ of the second gearing region is greater than (and not equal to) the above ratio, there is always a line contact, which is preferred. In this case the support region also cannot enter into the depressions (recesses) between each two adjacent ones of the tooth heads. A jolting is thus precluded.

In one alternative design, the second gearing region is not itself supported on the cylindrical support region; rather an outer circumferential surface region, using which a bearing or supporting on the support region is effected, is formed or provided on the stepped planetary gear or the planetary gears, which are connected to each other. This outer circumferential surface region can be formed directly on the stepped planetary gear or on the planetary gears, which are connected to each other, or by an outer-circumferential surface of another component, preferably of a sleeve component, provided thereon. The outer-circumferential surface or the outer-circumferential surface region is preferably configured such that the radial supporting (bearing) on the cylindrical support region is continuously ensured, independent of the (i.e. at every) rotational position of the stepped planetary gear or of the planetary gears, which are connected to each other. The sleeve component can be formed such that it is axially pushed onto the second gearing region, preferably pressed-on. Alternatively the sleeve component can be attached in any other manner and at another point on the stepped planetary gear or on the planetary gears, which are connected to each other.

When the outer diameter of the sleeve component or of the cylindrical outer circumferential surface region of the stepped planetary gear or the planetary gears, which are connected to each other, and the diameter of the support region on the input shaft each match the operating pitch circle diameter of the gearing between the first gearing region and the sun gear, the stepped planetary gear or the planetary gears, which are connected to each other, can roll on (rollingly contact) the cylindrical support region, preferably without friction. Thus there is preferably no sliding (slippage) at the support point. In this case this radial supporting (bearing) functions essentially without losses.

The supporting (bearing) of the planetary gear in the axial direction is preferably effected by thrust bearings, preferably by roller- and/or needle-roller-bearings. Exclusively thrust bearings, preferably exclusively roller- and/or needle-roller-bearings, can preferably be provided for axial supporting (bearing). Alternatively the axial supporting can be partially or completely effected by plain bearings. The essentially backlash-free supporting of the planetary gear in the radial direction is preferably effected exclusively by supporting (contacting, bearing) of the second gearing region on the cylindrical support region. By providing at least three planetary gears that are supported (borne) on the cylindrical support region and are distributed around the circumference, an advantageous supporting of the planetary gears and the components meshing with them is effected.

The input shaft can be supported within the output shaft. The input shaft can also be supported in the gearings of the planetary gears or of the stepped planetary gear. In this case a uniform load distribution can result. The output shaft is preferably radially supported in (by) the housing.

If a first support disk is preferably provided (as will be further discussed below), the planetary gears, which are connected to each other, or the stepped planetary gear can be supported (borne) in the axial direction on the (a first) side of the first gearing region with respect to the housing. The planetary gears, which are connected to each other, or the stepped planetary gear can be supported directly on the first support disk, sliding thereon. In this case a plain bearing is formed by the planetary gears, which are connected to each other, or the stepped planetary gear, and the first support disk. In this case the planetary gears, which are connected to each other, or the stepped planetary gear, and/or the first support disk, at least the portions that slide against each other, are preferably at least partially manufactured from a sliding (low friction) material, such as, for example, Teflon®.

For the supporting of greater forces, a first thrust bearing is preferably provided between the first support disk and either the planetary gears, which are connected to each other, or the stepped planetary gear. The first thrust bearing is preferably configured as a ball-, still more preferably as a roller- or needle-roller-bearing, which rotates (revolves) about the second axis (i.e. the rotational axis of the planetary gear).

The first thrust bearing is supported on one side on one end of the planetary gears, which are connected to each other, or of the stepped planetary gear, and on the other side on the first support disk. When the planetary gears, which are connected to each other, or the stepped planetary gear move(s), the first thrust bearing rotates (revolves) about the second axis (i.e. the rotational axis of the respective planetary gear), which in turn revolves (orbits) about the first axis (i.e. the rotational axis of the input- and output-shaft). For radial guiding, the first thrust bearing can, for example, be held radially on a shoulder of the planetary gears, which are connected to each other, or of the stepped planetary gear (not depicted).

In the axial direction, the first support disk is preferably directly axially supported (borne), to be freely rotatable about the first axis, on the housing by a third thrust bearing. Alternatively the first support disk can also be directly slidingly supported (borne) against or on the housing, i.e., the third thrust bearing can be a plain bearing that is formed by corresponding (facing, opposing) surfaces of the first support disk and of the housing. The first support disk can be supported radially on the first shaft, for example, by a plain bearing or a rolling-element bearing. Alternatively the supporting (bearing) in the radial direction is effected, for example, by the third thrust bearing, optionally by bearing grooves or depressions provided therefor. Since the revolution axis of the third thrust bearing coincides with the rotational axis of the first support disk, a low-friction and wear-resistant supporting can be ensured. Since the first support disk is preferably freely rotatable about the first rotational axis, in particular also freely rotatable about the first shaft (and the supporting with respect to the housing is low friction), the first support disk can be moved along about the first axis of rotation with the revolution (orbiting) of the first thrust bearing about the first rotational axis. Here the first support disk preferably has a speed of revolution that corresponds to or is slightly lower than the speed of revolution of the planetary gears, which are connected to each other, or of the stepped planetary gear. The latter can mean less wear on the first support disk due to (caused by) the changing bearing surface on the side of the first thrust bearing.

Alternatively the planetary gears, which are connected to each other, or the stepped planetary gear can be coupled with the first support disk such that they rotate or revolve (orbit) together about the first axis. For example, a shaft end protruding toward the first support disk, which shaft end is configured to be coaxial to the second axis, can be provided for this purpose, using which the planetary gears, which are connected to each other, or the stepped planetary gear are rigidly connected to the first support disk with respect to the revolving (orbiting) movement about the first axis. Preferably the shaft end is, for example, an end segment of a planetary shaft that extends coaxial to the second rotational axis and on which the planetary gears, which are connected to each other, or the stepped planetary gear are supported (borne). The end segment can preferably be held in a bore in the first support disk so as to be rotatable. The planetary shaft is preferably rigidly connected either to the first support disk, or to the planetary gears, which are connected to each other, or to the stepped planetary gear, and in each case is freely rotatably supported on or in the respective other. Instead of providing a planetary shaft, only an appropriate (suitable) bearing journal can also be provided on the planetary gears, which are connected to each other, or the stepped planetary gear. Alternatively a bearing journal can also be provided on the first support disk, which bearing journal protrudes into a corresponding hole in the planetary gears, which are connected to each other, or in the stepped planetary gear.

If the planetary gears, which are connected to each other, or the stepped planetary gear are/is radially supported (borne) in (by) the cylindrical support region, preferably no or only slight radial forces (only the forces that are required for the co-rotating of the first support disk) are transmitted from the planetary gears, which are connected to each other, or from the stepped planetary gear to the support disks, and vice versa. To avoid overdetermining of the radial supporting of the planetary gears, which are connected to each other, or of the stepped planetary gear on the support disks by a planetary shaft, the supporting of the support disks on the planetary gears, which are connected to each other, or on the stepped planetary gear can have a clearance fit.

Thus, in this example, the first support disk rotates simultaneously with the revolving (orbiting) of the planetary gears, which are connected to each other, or of the stepped planetary gear about the first rotational axis. Since the bearing axis of the third thrust bearing coincides with the rotational axis of the first support disk, a low-friction and wear-resistant supporting can be provided. Furthermore, the first thrust bearing rotates (revolves) about a bearing axis that is fixed with respect to the rolling surface on the first support disk. A low-friction or frictionless supporting is thereby ensured. No circumferential forces are transmitted to the support disk by the first thrust bearing.

The possible design and the possible arrangements of a second support disk preferably correspond to those of the first support disk, with the proviso that the supporting (bearing) is preferably not effected directly with respect to the housing, but rather with respect to a radially extending region (segment) of the second ring gear. In alternative embodiments in which an output torque of the second ring gear is tapped, for example, directly on (at) the radially outer side of the second ring gear, an axial supporting of the second support disk can also be effected directly with respect to the housing. The various arrangements and the designs can be combined with one another, i.e., the supporting on the first support disk need not be effected in the same way as the supporting on the second support disk. Like the first support disk, the second support disk preferably rotates about the first axis. Since the radially extending region (segment) of the second ring gear also rotates about the first axis, a fourth bearing, which rotates (revolves) about the first axis, can operate in a low-wear and low-friction manner.

Also similar to the first support disk, the second support disk can be provided to be rotatable about the first axis independent of the planetary gears, which are connected to each other, or of the stepped planetary gear. Alternatively, also like the first support disk, the second support disk can be coupled with the second axis of the planetary gears, which are connected to each other, or of the stepped planetary gear by an appropriate coupling (protruding ends, bearing journal, planetary shaft), so that the planetary gears, which are connected to each other, or the stepped planetary gear can in fact rotate freely about the second axis but revolve together with the second support disk about the first axis.

The planetary shaft is preferably pressed into (rigidly held in) a receptacle in one of the support disks; and in the respective other of the support disks, the planetary shaft is held to be freely rotatable about the second axis, so that the first and second support disks are movable relative to each other in the axial direction. In such a design the stepped planetary gear or the planetary gears, which are connected to each other, are freely rotatable about the planetary shaft.

The planetary gears, which are connected to each other, or the stepped planetary gear can be supported on the second support disk in a directly axially sliding manner, or the second thrust bearing can be provided axially between them.

As with the first support disk, the second thrust bearing can rotate (revolve) about the second axis. The second thrust bearing can be held radially on a shoulder or a depression of the planetary gears, which are connected to each other, or of the stepped planetary gear, or on a protruding end, a bearing journal, or the planetary shaft.

The axial supporting (bearing) of the second support disk with respect to the second ring gear (or the housing) can be effected either (as above) in a sliding manner (without an additional bearing), or by the fourth thrust bearing. The fourth thrust bearing, which is disposed axially between the second support disk and second ring gear (or the housing), can be held in position by grooves or depressions in the second ring gear (or in the housing) and/or in the second support disk.

The preferably provided axial supporting of the second ring gear with respect to the housing can be effected either directly in a sliding manner (plain bearing) or by a fifth thrust bearing. The fifth thrust bearing rotates (revolves) about the first axis, about which the radially connecting-region (segment) or radially extending-region (segment) of the second ring gear also rotates. A low-friction and low-wear supporting is thus effected.

The planetary transmission is preferably formed without a planet carrier on which the planetary gears, which are connected to each other, or the stepped planetary gear are normally radially supported in conventional planetary transmissions.

The supporting of the various tilting moments about axes perpendicular to the planetary rotational axis (second axis), which are caused on the one hand by the circumferential forces, radial forces, and possibly (in the case of helical gearing) axial forces acting in the gearings, and on the other hand by the resulting radial force on the support region, is effected by the axial forces that are supported on the first and second support disks. In particular, a first tilting moment about an axis that is parallel to the direction of the radial forces acting in the tooth engagements, which first tilting moment results from the circumferential forces arising in the tooth engagements, is supported by axial forces. Furthermore, a tilting moment about an axis that is parallel to the direction of the circumferential forces acting in the tooth engagements, which tilting moment results from the radial forces arising in the tooth engagements, from the support force in the cylindrical support region, and from the axial forces arising in the tooth engagements, is supported by axial forces.

Instead of providing one or both of the support disks, the axial forces can also be transmitted directly to the housing or radial wall segments of the ring gear by a plain- or ball-bearing assembly. In the case of omission of the support disks, it must be noted that roller bearings cannot be used.

It has been realized that a greater degree of efficiency, in terms of transmission technology, can already be achieved by suitably choosing tooth engagement angles and the numbers of teeth, but can be even further increased by the different (additional) supporting (bearing) of the tilting moments by axial forces on the planetary gear(s). The additional lateral guiding of the stepped planetary gear by the support disks also makes it possible that the stepped planetary gear can be made (embodied) less wide, since no radial bearings, which must typically support the tilting moments of the planetary gear in conventional planetary transmissions, need to be provided. The planetary transmission can thereby be designed to be shorter overall in the axial direction. Furthermore, there will be no bearing losses due to radial bearings in case the supporting is effected without radial bearings.

The outer circumference (addendum circle) of the sun gear is preferably larger than the outer diameter of the cylindrical support region.

Preferably at least two, preferably three, and still more preferably four or five sets of planetary gears, which are connected to each other, or stepped planetary gears are provided that are distributed uniformly around the circumference.

The first ring gear and the second ring gear preferably have different numbers of teeth. The difference in number of teeth of the gear steps of the first ring gear to the first gearing region, and/or of second ring gear to the second gearing region, preferably corresponds to the number of the planetary gear(s) or a multiple thereof.

The number of teeth of the first gearing region of the planet is preferably equal to the number of teeth of the second gearing region. The stepped planetary gear is preferably configured with a single, preferably continuous, gearing geometry. Each tooth thus preferably extends continuously over the entire width of the two (i.e. the first and second) gearing regions of the stepped planetary gear. In case of basically identical gearing geometries, it is preferred that the addendum circle of the first gearing region that meshes with the first ring gear is different from the (preferably larger than the) addendum circle of the second gearing region that meshes with the second ring gear. For example, the teeth in the second gearing region of the stepped planetary gear are more blunt/flat, wherein the number of teeth of the second ring gear is preferably greater by the number of the planetary gear(s) (or a multiple thereof) than the number of teeth of the first ring gear.

The first shaft can be supported inside the second shaft. If this supporting is omitted, the first shaft can be supported by the tooth engagement of sun-planetary gear. A uniform tooth engagement force (this applies in particular to three planetary gears) can thereby be achieved. The first shaft is preferably supported in the second shaft and/or in the housing because the planetary gears are thereby centered. In this case the planetary gears are radially guided and/or supported by the supporting (contact, bearing) on the cylindrical support region, and by the engagement with the gearings of the two ring gears.

The stepped planetary gear includes the first gearing region, i.e., a first gearing, and the second gearing region, i.e., a second gearing. In the case of planetary gears, which are connected to each other, the first planetary gear includes the first gearing region, i.e., a first gearing, and the second planetary gear includes the second gearing region, i.e., a second gearing. As indicated above, the first gearing region (i.e., the first gearing) and the second gearing region (i.e., the second gearing) can have the same gearing geometry and differ only in the size of the addendum circle. In the case of the stepped planetary gear, it can preferably be manufactured with continuous gearing geometry, and subsequently the addendum circle of one of the first or second gearing regions can be changed. In the case of planetary gears, which are connected to each other, two identical planetary gears can first be manufactured, of which one is then processed to change the size of the addendum circle.

All gears and further components are preferably essentially rigid components that are formed from conventional materials. An oil sump or another oil supply, etc. can be provided for lubrication.

As indicated above, the first thrust bearing is preferably formed either as a plain bearing directly on the corresponding surfaces of the components to be supported against each other (integral formation), or as a separate thrust bearing (separate bearing component). In the case of the separate thrust bearing, the first thrust bearing is preferably configured as at least one a sliding disk provided separately from the components to be supported against each other, or as a rolling-element bearing (for example, ball- or roller-bearing (which also includes the needle roller bearing as a subgroup)) with appropriate rolling elements (ball, roller, needle roller, barrel, etc.) and, if necessary, a bearing cage, etc. As is apparent from the above, in the present disclosure rolling-element-bearings are also referred to as "revolving thrust bearings." Such a revolving thrust bearing (rolling-element bearing), or its rolling elements, revolve about a bearing axis that is coaxial to the bearing. The remaining thrust bearings mentioned above (second, third, fourth, and/or fifth thrust bearing) are configured analogously to the first thrust bearing. Each of the remaining thrust bearing(s) is thus formed as a plain bearing directly on the corresponding surfaces of the components to be supported against each other, or as a separate thrust bearing (separate bearing component). For the case of the configuration as a separate thrust bearing, the respective one of the remaining thrust bearings is preferably formed as at least one sliding disk provided separately from the components to be supported against each other, or as a rolling-element bearing (for example ball- or roller-bearing, including needle roller bearing) with appropriate rolling elements and, if necessary, a bearing cage, etc. The thrust bearings can be formed differently from one another, i.e., each of the thrust bearings can be formed, independently of the other thrust bearings, as a plain bearing directly on the corresponding surfaces of the components to be supported against each other, or as a separate thrust bearing (separate bearing component). Furthermore, the design as a separate thrust bearing (plain bearing or rolling-element bearing) of each of the thrust bearings can also be independent of one another. The first and second thrust bearings are preferably both configured as rolling-element bearings.

Rolling-element bearings (as is typical in such bearings) are preferably used in a backlash-free manner; the components to be supported are thus preferably preloaded against one another. In the present disclosure the backlash-free setting/preloading is effected preferably either for each bearing separately, or pairwise, or over the entire transmission assembly or the housing. At least the first and/or second thrust bearing(s) is/are preferably thus set/preloaded backlash-free between the first support disk and the stepped planetary gear or the respective planetary gear, and the second support disk and stepped planetary gear or the respective planetary gear. This can be effected, for example, by tensioning via the planetary shaft or from outside via the further thrust bearings. Analogously a backlash-free setting is preferably to be provided for the other bearings, in particular when they are configured as rolling-element bearings.

In the case of plain bearings (both as a bearing component and as an integrally formed bearing), at least a slight clearance is preferably provided (as is typical in such bearings) between the components to be supported against each other, since otherwise the friction would be high. Analogously to the backlash-free setting, the setting with backlash is preferably effected either for each bearing separately, or pairwise, or over the entire transmission assembly.

As indicated above, both plain bearings and rolling-element bearings can also be used as the thrust bearings. Each of the plain bearings is preferably set or provided with backlash, and each of the rolling-element bearings is preferably set or provided without backlash.

Further aspects of the present disclosure include but are not limited to:

1. A planetary transmission (2), including
a housing (4),
a first shaft (6) having an externally toothed sun gear (8), which first shaft is rotatably supported in the housing (4) about a first axis (X1),
a first ring gear (12) that is provided in the housing (4) coaxial to the first shaft (6) in a non-rotatable manner,
a second ring gear (16) that is rotatably supported in the housing about the first axis (X1), and
either a stepped planetary gear (24) that is provided radially between the first shaft (6) and the ring gears (12, 16), and that includes a first gearing region (26) that meshes with the sun gear (8) and the first ring gear (12), and a second gearing region (28) that meshes with the second ring gear (16), or a first planetary gear that is provided radially between the first shaft (6) and the first ring gear (12), and that includes a first gearing region that meshes with the sun gear (8) and the first ring gear (12), and a second planetary gear that is provided radially between the first shaft (4) and the second ring gear (16), and is coaxially connected to the first planetary gear in a torque-proof manner to rotate therewith, and that includes a second gearing region (28) that meshes with the second ring gear (16),
wherein
on the first shaft (6), a cylindrical support region (32) is provided that is provided coaxial to the first shaft (6), on which cylindrical support region the stepped planetary gear (24) or the planetary gears, which are connected to each other, are radially supported (borne).

2. Planetary transmission according to Aspect 1, wherein the outer diameter of the cylindrical support region (32) matches the operating pitch circle diameter of the sun gear (8) in the gearing between the sun gear (8) and the first gearing region (26).

3. Planetary transmission according to Aspect 1 or 2, wherein
the second gearing region (28) is helically geared and has an addendum circle,
the stepped planetary gear (24) or the planetary gears, which are connected to each other, is/are supported on the cylindrical support region (32) by the outer circumferential surface of the second gearing region (28), and
the second gearing region (28) lies on the addendum circle of the second gearing region (28).

4. Planetary transmission according to Aspect 3, wherein the face contact ratio ($\varepsilon_\beta$) of the second gearing region (28) is greater than or equal to one.

5. Planetary transmission according to one of Aspects 2 or 3, wherein
the face contact ratio of the second gearing region (28) is greater than or equal to the ratio of the pitch (p) minus the tooth head width ($b_1$) of the second gearing region (28) to the pitch (p) of the second gearing region (28).

6. Planetary transmission according to Aspect 1 or 2, wherein
a sleeve component (62) is provided on the stepped planetary gear (24) or on the planetary gears, which are connected to each other, which sleeve component has a cylindrical outer circumferential surface that is coaxial to the planetary rotational axis (X2), using which the stepped planetary gear (24) or the planetary gears, which are connected to each other, are radially supported (borne) on the cylindrical support region (32), or
the stepped planetary gear (24) or the planetary gears, which are connected to each other, include a cylindrical outer circumferential region that is coaxial to the planetary rotational axis (X2), using which the stepped planetary gear (24) or the planetary gears, which are connected to each other, are radially supported (borne) on the cylindrical support region (32).

7. Planetary transmission according to any one of Aspects 1 to 6, wherein
tilting moments perpendicular to the rotational axis of the stepped planetary gear or of the planetary gears, which are connected to each other, which act on the stepped planetary gear or on the planetary gears, which are connected to each other, in operation due to the torque transmission, are supported by axial supporting (bearing) of the stepped planetary gear or of the planetary gears, which are connected to each other.

8. Planetary transmission according to any one of Aspects 1 to 7, that further includes
A first support disk (36), which is provided on the (a first) side of the first gearing region (26) of the stepped planetary gear (24) or on the (a first) side of the first planetary gear, which first support disk is provided coaxial to the first axis (X1) and is rotatable about it, for axial supporting (bearing) of the stepped planetary gear (24) or of the planetary gears, which are connected to each other, and/or
a second support disk (40), which is provided on the (a second) side of the second gearing region (26) of the stepped planetary gear (24) or on the (a second) side of the second planetary gear, which second support disk is provided coaxial to the first axis (X1) and is rotatable about it, for axial supporting (bearing) of the stepped planetary gear (24) or of the planetary gears, which are connected to each other.

9. Planetary transmission according to Aspect 8, wherein
a first thrust bearing (38) is provided coaxial to a planetary rotational axis (X2) between the first support disk (36) and the stepped planetary gear (24) or the first planetary gear, for axial support; or the stepped planetary gear (24) or the first planetary gear is slidingly axially supported (borne) directly on the first support disk (36), and/or
a second thrust bearing (42) is provided coaxial to the planetary rotational axis (X2) between the second support disk (40) and the stepped planetary gear (24) or the second planetary gear, for axial support; or the stepped planetary gear (24) or the second planetary gear is slidingly axially supported (borne) directly on the second support disk (40).

10. Planetary transmission according to Aspect 8 or 9, wherein
between the first support disk (36) and the housing (4), a third thrust bearing (44) is provided coaxial to the first axis (X1); or the first support disk (36) is slidingly axially supported (borne) on the housing (4).

11. Planetary transmission according to any one of Aspects 8 to 10, wherein
the planetary rotational axis (X2) is coupled with at least one of the first and second support disks (36, 40) such that the rotation of the at least one of the first and second support disks (36, 40) about the first axis (X1) results in that the stepped planetary gear (24) or the first and the second planetary gear revolves about the first axis (X1).

12. Planetary transmission (2) according to any one of the preceding Aspects, including
a second shaft (22) that is connected to the second ring gear (16) in a torque-proof manner and rotates with it about the first axis (X1),
wherein
the second ring gear (20) is connected to the second shaft (22) in a torque-proof manner to rotate therewith via a radial extension region (segment) (20) of the second ring gear (16), or a connecting region (segment) extending radially from the second ring gear (16) to the second shaft (22) is provided.

13. Planetary transmission according to Aspect 12, wherein
the second support disk (40) is provided between the stepped planetary gear (24) or the second planetary gear, and a radial extension region/segment (20) of the second ring gear (16) or a connecting region/segment extending radially from the second ring gear (16) to the second shaft (22), and
between the second support disk (40) and the radial extension region (20) of the second ring gear (16) or the radially extending connecting region, a fourth thrust bearing (48) is provided coaxial to the first axis (X1), or the second support disk (4) is slidingly axially supported (borne) on the radial extension region/segment (20) of the second ring gear (16) or on the radially extending connecting region/segment.

14. Planetary transmission according to Aspect 12 or 13, wherein
the second ring gear (16) is supported in the axial direction by a fifth thrust bearing (52) that is provided between the housing (4) and one of the radial extension region/segment (20) of the second ring gear (16) or the connecting region/segment that extends radially from the second ring gear (16) to the second shaft (22), and is coaxial to the first axis (X1).

15. Planetary transmission according to any one of Aspects 12 to 14, wherein
the second shaft (22) is supported (borne) in the radial direction by a radial bearing that is provided between the first shaft (6) and one of (i) an axially extending inner-circumferential surface of the second shaft (22), which is configured in a hollow manner, or an axial connecting region/segment that extends from the second ring gear (16) to the second shaft (22).

16. Planetary transmission according to any one of the preceding Aspects, when dependent on Aspect 8, wherein at least one, preferably all, of the thrust bearings are needle-roller-bearings or roller-bearings.

17. Planetary transmission according to any one of the preceding Aspects, wherein
no planet carrier is provided that radially supports the stepped planetary gear (24) or the planetary gears, which are connected to each other, on the first or second shaft.

18. Planetary transmission according to any one of the preceding Aspects, wherein
a plurality of stepped planetary gears (24) or a plurality of the planetary gears, which are connected to each other, is provided.

19. Planetary transmission according to any one of the preceding Aspects, wherein
the first gearing region (26) and the second gearing region (28) of the stepped planetary gear (24) are formed from a continuous gearing.

20. Planetary transmission according to any one of the preceding Aspects, wherein at least one, preferably all, of the thrust bearings are formed as rolling-element bearings, preferably ball bearings.

21. Planetary transmission (2), including
a housing (4),
a first shaft (6) that is rotatably supported in the housing (4) about a first axis (X1),
a first ring gear (12) that is provided coaxial to the first shaft (6) and is not rotatable in the housing (4),
a second ring gear (16) that is rotatably supported in the housing about the first axis (X1),
a planet, having a planetary rotational axis (X2), that is configured either as a stepped planetary gear (24) or as a planetary subassembly that is formed from a first planetary gear and a second planetary gear that rotate about a common planetary axis (X2), wherein the planet includes a first gearing region (26) that meshes with the first ring gear (12), and a second gearing region (28) that meshes with the second ring gear (16), so that during rotation of the first shaft (6), the planetary rotational axis (X2) revolves (orbits) about the first axis (X1),
a first support disk (36), for the axial supporting of the planet, that is provided on the (a first) side of the first gearing region (26) of the planet coaxial to the first axis (X1) and is rotatable about it, and a second support disk (40), for the axial supporting of the planet, that is provided on the (a second) side of the second gearing region (26) of the planet coaxial to the first axis (X1) and is rotatable about it, and
preferably an externally toothed sun gear (8) that is provided on the first shaft (6),
wherein
the planet is preferably disposed radially between the sun gear (8) and the first ring gear (14), and meshes with the sun gear (8) and the first ring gear (14), wherein the planetary rotational axis (X2) lies radially between the sun gear and the first ring gear,
characterized in that
preferably between the first support disk (36) and the planet, for axial supporting (bearing), a first, preferably revolving, thrust bearing (38) is provided coaxial to the planetary rotational axis (X2), or the planet is sliding axially supported (borne) directly on the first support disk (36), and/or
preferably between the second support disk (40) and the planet, for axial supporting (bearing), a second, preferably revolving, thrust bearing (42) is provided coaxial to the planetary rotational axis (X2), or the planet is slidingly axially supported (borne) directly on the second support disk (40).

22. Planetary transmission according to Aspect 21, wherein
the planetary gear(s) is (are) coupled with at least one of the first and second support disks (36, 40) such that the at least one of the first and second support disks (36, 40) revolves together with the planetary gear(s) about the first axis (X1).

23. Planetary transmission according to Aspect 21 or 22, wherein on the first shaft (6) a cylindrical support region (32) is provided that is coaxial to the first shaft (6), on which cylindrical support region the planetary gear(s) is/are radially supported (borne).

24. Planetary transmission according to Aspect 23, wherein the outer diameter of the cylindrical support region (32) matches the operating pitch circle diameter of the sun gear (8) in the gearing between the sun gear (8) and the first gearing region (26).

25. Planetary transmission according to Aspect 24, wherein the second gearing region (28) is helically toothed, and the planetary gear(s) having the outer-circumferential surface of the second gearing region (28) lying on the addendum circle of the second gearing region (28) is/are supported (borne) on the cylindrical support region (32), or on the planetary gear(s), a sleeve component (62) is provided that has a cylindrical outer-circumferential surface that is coaxial to the planetary rotational axis (X2), using which sleeve component (62) the planet is radially supported (borne) on the cylindrical support region (32), or the planet includes a coaxial cylindrical outer-circumferential region, using which the planet is radially supported (borne) on the support region (32).

26. Planetary transmission according to any one of Aspects 21 to 25, wherein between the first support disk (36) and the housing (4), a third thrust bearing (44) is provided coaxial to the first axis (X1); or the first support disk (36) is slidingly axially supported (borne) on the housing (4).

27. Planetary transmission (2) according to any one of Aspects 21 to 26, including a second shaft (22) that is rigidly connected or formed integrally with the second ring gear (16), and rotates with the second ring gear (16) about the first axis (X1), wherein the second support disk (40) is provided between the end side, lying on the side of the second gearing region (26), of the planet and a radial extension region/segment (20) of the second ring gear (16) or a connecting region/segment extending radially from the second ring gear (16) to the second shaft (22), and between the second support disk (40) and the radial extension region (20) of the second ring gear (16) or the radially extending connecting region, a fourth thrust bearing (48) is provided coaxial to the first axis (X1); or the second support disk (40) is slidingly axially supported (borne) on the radial extension region/segment (20) of the second ring gear (16) or on the radially extending connecting region/segment.

28. Planetary transmission according to Aspect 27, wherein the second ring gear (16) is supported (borne) in the axial direction by a fifth thrust bearing (52) that is provided between the housing (4) and one of (i) the radial extension region/segment (20) of the second ring gear (16) or (ii) the connecting region/segment that extends radially from the second ring gear (16) to the second shaft (22), the fifth thrust bearing being disposed coaxial to the first axis (X1).

29. Planetary transmission according to any one of Aspects 21 to 28, wherein at least one, preferably all, of the thrust bearings are rolling-element bearings, preferably ball-, needle-roller-, or roller-bearings.

BRIEF DESCRIPTION OF THE DRAWINGS

Preferred embodiments are described below with reference to the Figures.

DETAILED DESCRIPTION OF THE INVENTION

Embodiments are described below with reference to the Figures. Identical or similar features are indicated in all Figures by the same reference numbers, wherein for reasons of clarity, not all reference numbers are used in all Figures.

Figure 1:
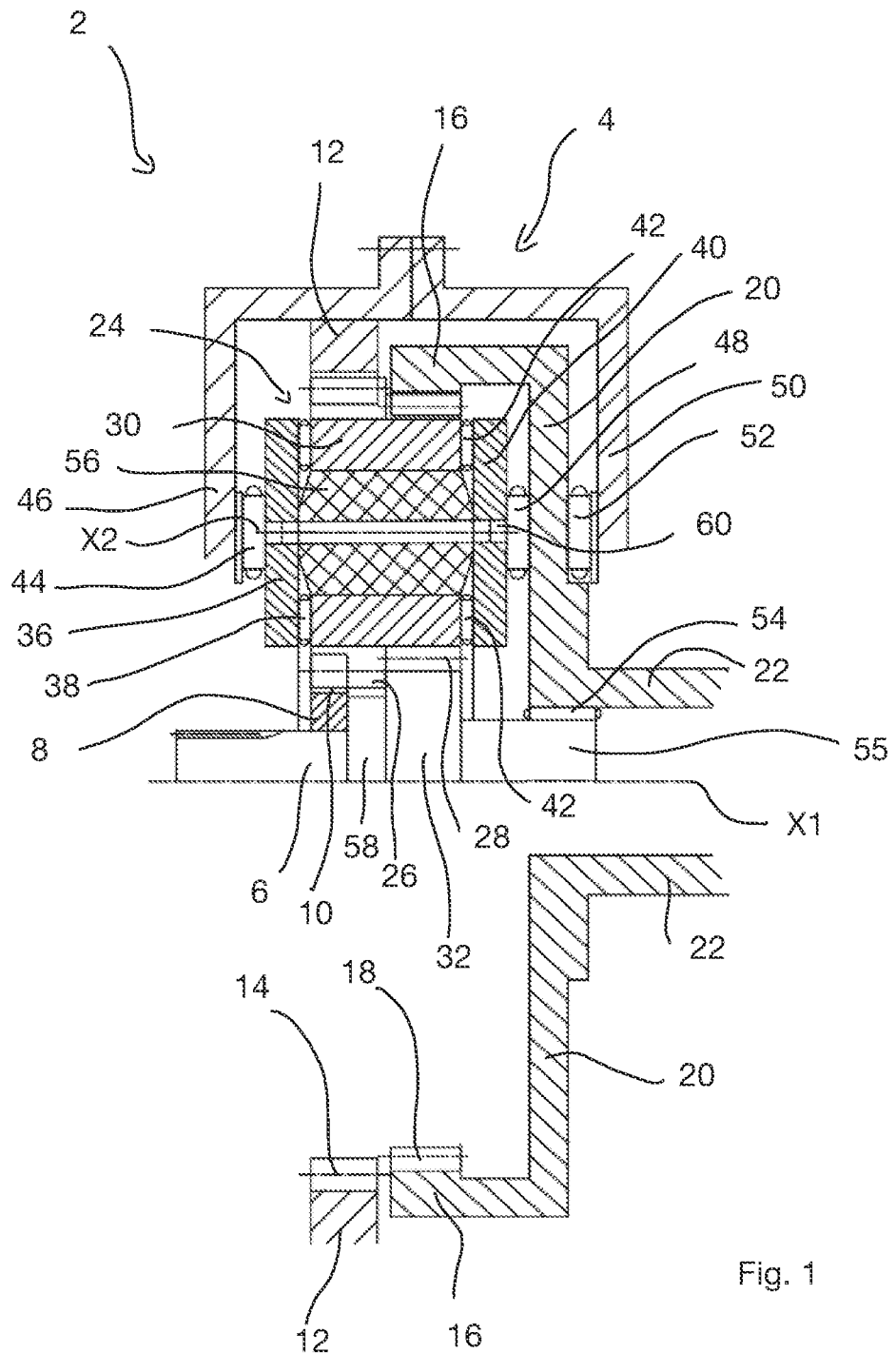
FIG. 1 shows a schematic partial cross-sectional view of a planetary transmission according to a first embodiment of the present teachings.

The planetary transmission 2 shown in FIG. 1 includes a housing 4 that is, for example, rigidly connected to a drive machine or to its housing. This drive machine can be, for example, an electric motor or an internal combustion engine. The planetary transmission 2 includes a first shaft 6 that is preferably the input- or drive-shaft of the planetary transmission 2. In operation of the planetary transmission 2, the first shaft 6 rotates about a first axis X1. In FIG. 1, the housing 4, the first shaft 6, and other components, which are described below, are only depicted above the first axis X1, even though they are also formed below the axis X1 as rotationally symmetric components.

The first shaft 6 is drivable starting from the left side in FIG. 1. As is also apparent from FIG. 2, an externally toothed sun gear 8 that is rotatable with the first shaft 6 about the first axis X1 is provided on the first shaft 6. In the present embodiment, the sun gear 8 is pressed onto the shaft 6 starting from the left end of the first shaft in FIG. 1. The sun gear 8 is preferably rigidly (fixedly) attached to the first shaft 6. The externally toothed sun gear 8 can have a straight- or helically-toothed gearing region 10.

Furthermore, a first ring gear 12 is provided that is rigidly provided, preferably fixedly attached, in (to) the housing 4 coaxial to the first shaft 6. For example, the first ring gear 12 is pressed into the housing 4 or is screwed into it. The first ring gear 12 has an internal gearing 14. The first ring gear 12 is configured such that the internal gearing 14 is disposed radially outside (preferably overlapping, viewed in the radial direction) of the sun gear 8 with a radial spacing to the gearing region 10 of the sun gear 8.

In FIG. 1 right-side, adjacent to the first ring gear 12, a second ring gear 16 is provided, which is provided coaxial to the first shaft X1 and is rotatable about the first axis X1. The second ring gear 16 includes an internal gearing 18. The second ring gear 16 includes a radial extension region (segment) 20 that radially connects the internal gearing 18 (or an internally toothed region) to a second shaft 22. The second shaft 22 is provided coaxial to the first axis X1, and is rigidly connected to the second ring gear 16 or is, in the present first embodiment, formed integrally with the second ring gear 16, and is rotatable by the second ring gear 16 about the first axis X1.

Furthermore, a stepped planetary gear 24 is provided. The stepped planetary gear 24 also is schematically depicted in FIG. 3A and FIG. 3B in more detail. As is apparent from FIGS. 1 and 3A and 3B, in its left-side region the stepped planetary gear 24 includes a first externally toothed gearing region (external gear teeth) 26, and in its right-side region includes a second externally toothed gearing region (external gear teeth) 28. Both gearing regions 26, 28 are provided on a base body 30 of the stepped planetary gear 24 or are formed integrally with it. In the integral formation, the gearing regions 26, 28, for example, are milled out from the base body 30. Alternatively the gearing regions 26, 28 are attached to the base body 30 (for example, pressed-on, not depicted here).

Figure 2:
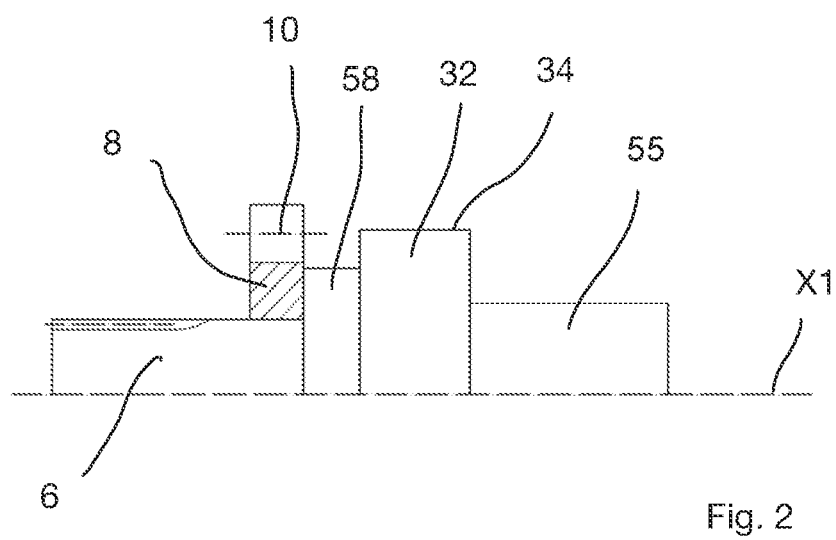
FIG. 2 shows a schematic partial cross-sectional view of an input shaft of the planetary transmission according to the first embodiment, FIG. 3A and FIG. 3B respectively show different schematic partial cross-sectional views of the stepped planetary gear of the planetary transmission according to the first embodiment, including impinging forces.

As is depicted in FIGS. 1 and 2, the first shaft 6 includes a cylindrical support region 32 adjacent to the gearing region 10 of the sun gear 8 on the right (in the present first embodiment, spaced apart). The support region 32 includes a (cylindrical) outer-circumferential surface 34 formed coaxial to the first shaft 6. The support region can also be configured as a sleeve that is fixedly connected to the first shaft 6.

The above-mentioned parts and/or components are configured and disposed such that the first gearing region 26 of the stepped planetary gear 24 meshes on the radially inner side with the sun gear 8, and simultaneously meshes with the internal gearing 14 of the first ring gear 12 on the radially outer side. At the same time, the second gearing region 28 of the stepped planetary gear 24 meshes on the radially outer side with the inner gearing 18 of the second ring gear 16. Thus, on the radially inner side, the addendum circle of the second gearing region 28 is in contact with the outer-circumferential surface 34 of the cylindrical support region 32.

The stepped planetary gear 24 is thus radially supported (borne) at different points in the axial direction (and/or forces from the torque transmission act in the gearings), namely on one side between the first ring gear 12 and the sun gear 10, and on the other side between the second ring gear 16 and the support region 32.

Furthermore, the second gearing region 28 and the support region 32 are configured such that the addendum circle (-diameter) of the second gearing region 28 matches (equals) the operating pitch circle (-diameter) of the gearing between the first gearing region 26 of the stepped planetary gear 24 and the gearing region 10 of the sun gear 8.

In operation, i.e., while the first shaft 6 is being rotated, the rotation of the first shaft 6 is transmitted to the stepped planetary gear 24 via the sun gear 8. Because the first ring gear 12 is fixedly held in the housing so that the first ring gear 12 is not rotatable, the stepped planetary gear 24 revolves (orbits) about the first axis X1 while it is rotating about its own rotational axis, which is referred to below as second axis X2. These superimposed movements, i.e., the rotation about its own rotational axis (about the second axis X2 that is revolving (orbiting) about the first axis X1 (this corresponds to the planetary rotational speed according to Müller)) and the simultaneous revolving (orbiting) about the first axis X1 (this corresponds to the planet carrier rotational speed according to Müller) are transmitted (converted), via the tooth engagement of the second gearing region 28 with the second ring gear 16, into a rotational movement of the second ring gear 16 about the first axis X1. This is finally output as a drive on the second shaft 22.

Since the second gearing region 28 rolls with its addendum circle on the outer circumference of the cylindrical support region 32, which is identical to the operating pitch circle of the gearing of the sun gear 8 and of the first gearing region 26, the second gearing region 28 and the outer-circumferential surface 34, which contacts it, of the cylindrical support region 32 rotate with identical circumferential speeds, so that no sliding (slippage) occurs in the rolling movement. As is further explained below, owing to the helical gearing of the second gearing region 28, it is ensured that a supporting in (bearing on, contact with) the addendum circle is effected independently of the (i.e. at every) rotational position of the stepped planetary gear 24, i.e., no jolting can occur.

Furthermore, in this first embodiment the stepped planetary gear 24 is advantageously additionally supported (borne) in the axial direction, in particular by at least the thrust bearings 38 and 42. For supporting of the side that is on the left in FIG. 1, a first support disk 36 is provided on the left side adjacent to the stepped planetary gear 24.

Figure 4:
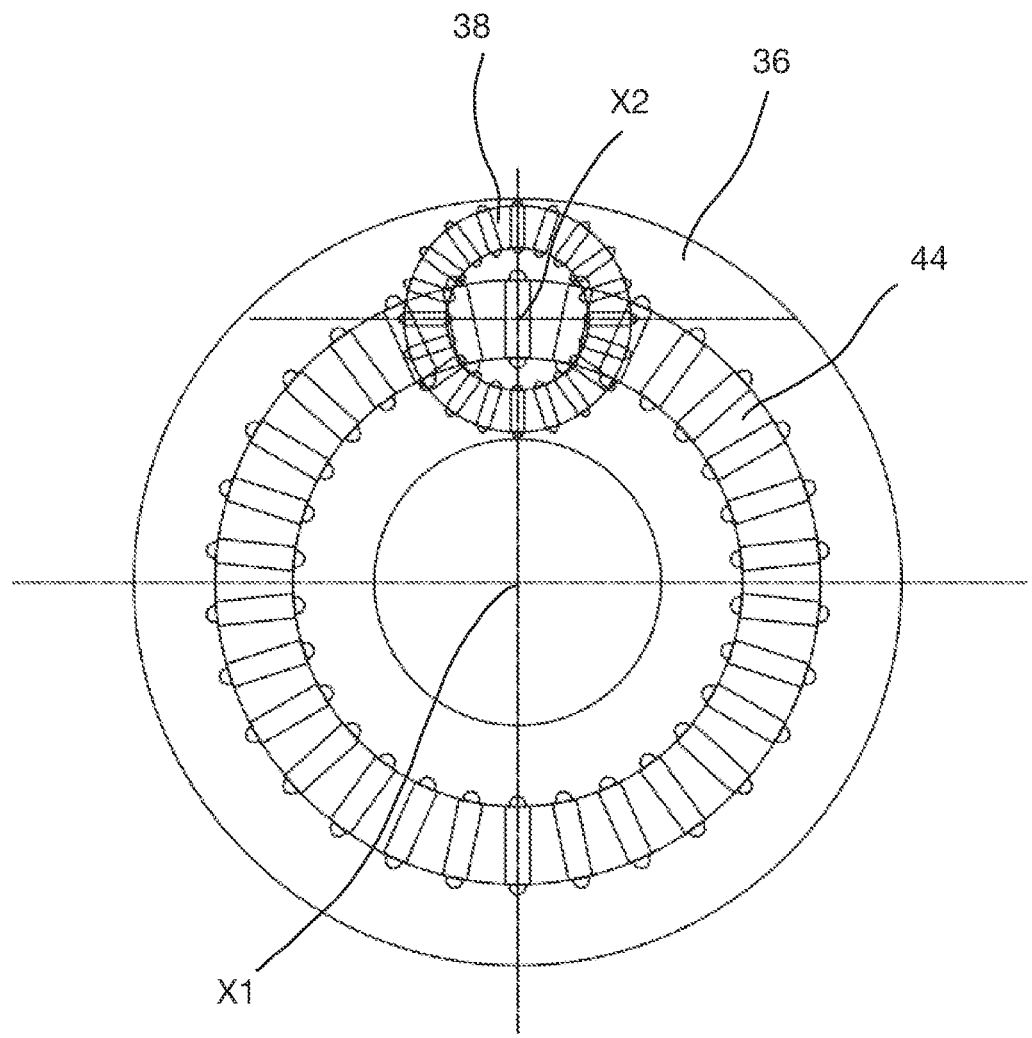
FIG. 4 shows a schematic side view of parts or components of the planetary transmission according to the first embodiment.

In the axial direction between the first support disk 36 and the stepped planetary gear 24, a first thrust bearing 38 is provided that is configured as a roller bearing in the present embodiment, and axially supports (bears) the stepped planetary gear 24 with respect to the first support disk 36. The first support disk 36 is configured in an annular manner and is disposed coaxial to the first axis X1. The ring outer diameter and the ring inner diameter of the first support disk 36 are preferably configured such that the difference of the two is greater than the outer diameter of the first thrust bearing 38. Furthermore, the ring inner diameter here is preferably larger than the addendum circle of the sun gear 8. The first thrust bearing 38 is configured and disposed such that it rotates (revolves) about the second axis X2 (the rotational axis of the stepped planetary gear 24) during rotation of the stepped planetary gear 24 about the second axis X2, i.e., the first thrust bearing 38 is disposed coaxial to the second axis X2. Furthermore, the first thrust bearing 38 is configured such that on the one side (right side in FIG. 1) it rolls (contacts) on the base body 30, and on the other side it rolls on (contacts) the first support disk 36. FIG. 4 shows a schematic side view from which inter alia the design of the first thrust bearing 38 and of the first support disk 36 whose relative arrangement is apparent. The additional first thrust bearings for the additional stepped planetary gears are not shown.

For supporting of the side that is right in FIG. 1, a second support disk 40 is provided on the right side adjacent to the stepped planetary gear 24. The second support disk 40 is preferably configured in an annular manner identical or similar to the first support disk 36, and is disposed coaxial to the first axis X1. The ring outer diameter and the ring inner diameter of the second support disk 40 are configured as described above for the first support disk 36.

In the axial direction between the second support disk 40 and the stepped planetary gear 24, a second thrust bearing 42 is provided that is configured as a roller bearing in the present embodiment and supports (bears) the stepped planetary gear 24 against the second support disk 40. The second thrust bearing 42 is configured such that it rotates (revolves) about the second axis X2 (the rotational axis of the stepped planetary gear 24) during rotation of the stepped planetary gear 24 about the second axis X2, i.e., the second thrust bearing 42 is disposed coaxial to the second axis X2. Furthermore, it is configured such that on the one side (left side in FIG. 1) it rolls on (contacts) the base body 30, and on the other side it rolls on (contacts) the second support disk 40. FIG. 4, which concerns the first support disk 36, is to be applied to the second support disk 40 in an analogous manner.

Furthermore, for the axial supporting (bearing) of the first support disk 36 (on the side facing away from the stepped planetary gear 24), a third thrust bearing 44 is provided in the axial direction between the first support disk 36 and the housing 4. The third thrust bearing 44 is thus provided on the side, which is left in FIG. 1, of the first support disk 36, and is supported against a first radially extending housing wall segment 46 of the housing 44. The third thrust bearing 44 rotates (revolves) about the first axis X1, and is, for example, radially guided by a not-shown bearing groove in the first radially extending housing wall segment 46 or in the first support disk 36. The schematic side view shown in FIG. 4 shows the design and relative arrangement of the third thrust bearing 44 relative to the first support disk 36.

On the other side, for the axial supporting (bearing) of the second support disk 40, a fourth thrust bearing 48 is provided in the axial direction between the second support disk 40 and the radial extension region 20 of the second ring gear 16. The fourth thrust bearing 48 is thus provided on the side, which is right in FIG. 1, of the second support disk 40, and is supported against the radial extension region 20 of the second ring gear 16. The fourth thrust bearing 48 rotates (revolves) about the first axis X1, and is, for example, guided radially, as described with the first support disk 36. FIG. 4 is to be applied to the fourth thrust bearing 48 in an analogous manner.

For further axial supporting (bearing) of the second ring gear 16, on the side opposite to the planetary gear a fifth thrust bearing 52 is additionally provided in the axial direction between the radial extension region 20 of the ring gear 16 and a second radially extending housing wall segment 50 of the housing 4. The fifth thrust bearing 52 rotates (revolves) about the first axis X1, and is, for example, radially guided on a projection in the radial extension region (segment) 20 of the ring gear 16.

In the present embodiment, a first radial bearing 54 is additionally provided, using which the second shaft 22, which is connected to the second ring gear 16 and is configured as a hollow shaft, is radially supported (borne) on the radially inner side on a (right-side in FIG. 1) end segment 55 of the first shaft 6.

For the radial supporting (bearing) of the first support disk 36 and of the second support disk 40, in this embodiment a shaft carrier body 56 is provided inside the hollow-configured base body 30 of the stepped planetary gear 24. In the shaft carrier body 56, a planetary shaft 60 is received, about which the stepped planetary gear 24 rotates. The planetary shaft 60 is thus configured coaxial to the second axis X2 and is freely rotatable about the second axis X2 with respect to the stepped planetary gear 24. On the axial ends, the planetary shaft 60 includes shaft ends protruding from the shaft carrier body 56 in the axial direction that are received in respective receiving holes in the first and second support disk 36, 40. The receiving is effected here such that the planetary shaft 60 is pressed into at least in one of the support disks 36, 40, and in the other disk has a clearance fit by which a free axial movement of the first support disk 36 with respect to the second support disk 40 is possible or vice versa. The shaft carrier body 56 can freely rotate on the planetary shaft 60. In the present embodiment it is slidingly supported, and preferably has a clearance fit to avoid a possible overdetermining. Alternatively a separate bearing component can be provided. In a further alternative, the base body 30 can be configured to be freely rotatable relative to the shaft carrier body 56, also here, for example, via a bearing component.

The rotational axis of the stepped planetary gear 24 is thereby coupled with the first and second support disk 36, 40 such that, as the stepped planetary gear 24 revolves (orbits) about the first axis X1, the stepped planetary gear 24 also causes the first and second support disk 36, 40 to rotate about the first axis X1.

As indicated above, a particularly low-friction axial supporting is thereby ensured between the stepped planetary gear 24 and the first and second support disk 36, 40, since the rotational axis X2 of the stepped planetary gear 24 has the same circumferential speed about the first axis X1 as the support disks 36 and 40, and thus no slip occurs between the thrust bearings 38 and 42 and the support disks 36 and 40.

Overall, the following advantageous force- and torque-arrangement can be obtained with the described design, as depicted, for example, in FIGS. 3A and 3B: in operation, that is, during transmission of a torque by the transmission, the input torque is transmitted from the sun gear 8 to the stepped planetary gear 24. Here a circumferential force $F_{uS}$ acts in the engagement between the gearing region 10 of the sun gear 8 and the first gearing region 26 of the stepped planetary gear 24; a radial force $F_{rS}$ and (with helical gearing) an axial force $F_{axS}$ act on the stepped planetary gear 24. With the rolling and supporting of the first gearing region 26 on the first ring gear 12, in the engagement between the same each of a circumferential force $F_{uH1}$, a radial force $F_{rH}1$, and (with helical gearing) an axial force $F_{axH1}$ acts on the stepped planetary gear 24. Furthermore, in the engagement between the second gearing region 28 of the stepped planetary gear 24 and the second ring gear 16, each of a circumferential force $F_{uH2}$, a radial force $F_{rH2}$, and, due to the helical gearing, an axial force $F_{axH2}$ acts on the stepped planetary gear 24.

The above-mentioned radial forces acting in the gearings partially balance out and lead to a resulting radial support force $F_A$, which acts, starting from the support region 32, on the stepped planetary gear 24 (force equilibrium in the radial direction).

The above-mentioned axial forces acting in the gearings partially balance out depending on the orientation of the helical gearing, or increase and must be supported axially.

Furthermore, from the radial-, axial-, and circumferential-forces acting in the gearings, and the radial supporting force and the axial forces acting in the gearings, two different tilting moments result perpendicular to the second axis X2, about which the stepped planetary gear 24 rotates. In particular, a first tilting moment results about the y-axis shown in FIGS. 3A and 3B, and a second tilting moment results about the z-axis shown in FIGS. 3A and 3B.

The supporting (bearing) of the tilting moments and the supporting (bearing) of the acting axial forces preferably occurs in the axial direction (toward the second axis X2 that corresponds to the x-axis in FIG. 3A, 3B) via the thrust bearings 38, 42 (or in embodiments in which the thrust bearings 38, 42 are not present, via direct supporting (bearing) on the support disks 36, 40) disposed between the support disks 36, 40 and the stepped planetary gear 24. The required axial support forces arise from the force- and torque-equilibrium. In particular, a tilting moment about the y-axis resulting from the above circumferential forces is supported by the axial forces $F_{ax1}$ and $F_{ax2}$. A tilting moment about the z-axis resulting from the radial forces, the support force $F_A$, and the axial forces of the gearings is supported by the axial forces $F_{ax3}$ and $F_{ax4}$. Depending on the backlash of the gearings or in the bearings, the forces act only at the marked points or over surface regions.

The forces can be calculated by conventional means (simulation, etc.) and the components are designed accordingly. The friction forces (not indicated) from the axial forces act against the direction of movement and generate counteracting torques in the support disks 36 and 40. The planetary shaft 60 pressed into one support disk 36, 40 ensures synchronous running of the support disks 36, 40.

It has been realized that a greater degree of efficiency, in terms of the transmission technology, is already achieved by suitably choosing the tooth engagement angles and the numbers of teeth. The additional lateral guiding of the stepped planetary gear by the support disks also makes it possible that the stepped planetary gear can be made (embodied) less wide, since now the tilting moments no longer need to be supported by radial supporting (i.e., the radial bearings normally present in conventional transmissions can be omitted without replacement), whereby the planetary transmission can be designed to be shorter overall in the axial direction.

As can be seen from FIGS. 1 and 2, in the first embodiment the shaft 6 has a coaxially disposed, preferably cylindrical, recessed segment 58, which has an outer diameter that is smaller than the root circle of the sun gear 8, between the support region 32 and the sun gear 8. It is thereby ensured that the first gearing region 26 of the stepped planetary gear 24 cannot come into contact with the gearing region 10 of the sun gear 8.

Figure 5:
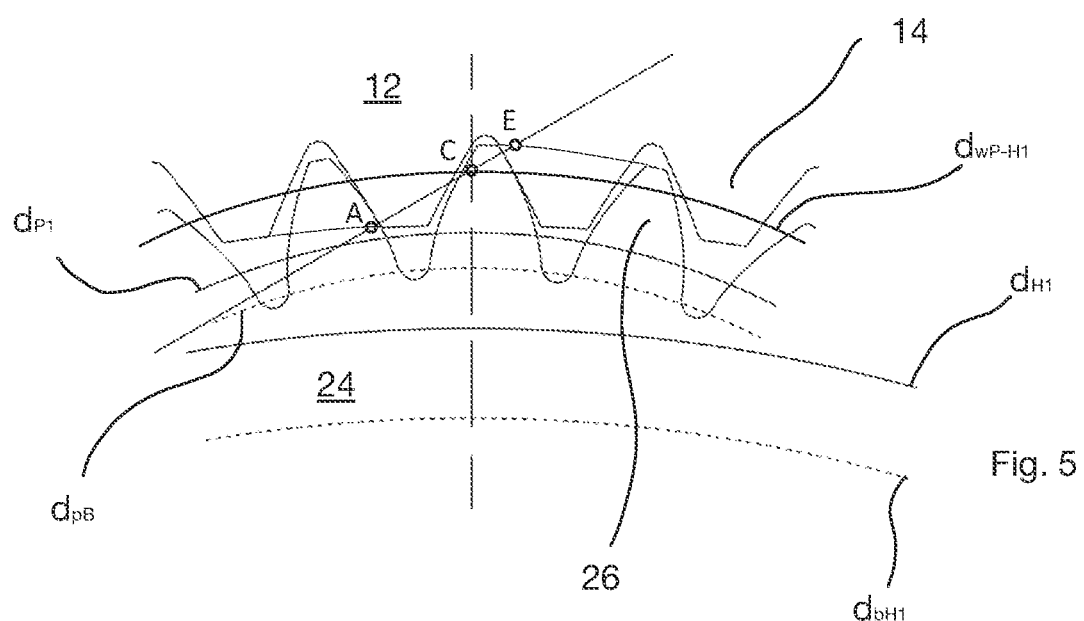
FIG. 5 shows a schematic side view of the gearing between the first ring gear and the first gearing region of the stepped planetary gear of the planetary transmission according to the first embodiment.

FIG. 5 shows the gear pairing or the engagement between the inner gearing 14 of the first ring gear 12 and the first gearing region 26 of the stepped planetary gear 24. $d_{P1}$ is the standard pitch circle and $d_{bP}$ is the base circle of the first gearing region 26 of the stepped planetary gear 24. $d_{H1}$ is the standard pitch circle and $d_{bH1}$ is the base circle of the inner gearing 14 of the first ring gear 12. $d_{wP-H1}$ is the operating pitch circle of the engagement between the first gearing region 26 and the inner gearing 14 of the first ring gear 12 that extends through the pitch point C. As can be seen, the gearings are configured such that the first gearing region 26 of the stepped planetary gear 24 meshes with the inner gearing 14 of the first ring gear 12 only at the end of the involute (before the minimum topland) with a large operating pressure angle, and simultaneously the pitch point C falls approximately in the center of the path of contact AE. A so-called low-loss gearing with the lowest losses is thus realized. The path of contact AE is a portion of the line of contact that results from the tangents to the two base circles $d_{bH1}$ and $d_{bP}$.

Figure 6:
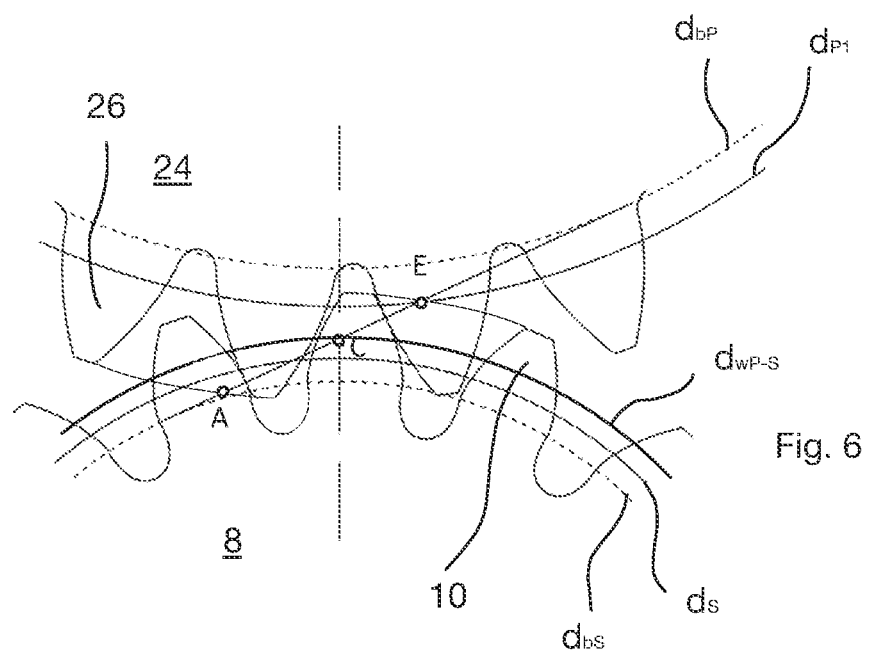
FIG. 6 shows a schematic side view of the gearing between the first gearing region of the stepped planetary gear and the sun gear of the planetary transmission according to the first embodiment.

FIG. 6 shows the gear pairing or the engagement between the first gearing region 26 of the stepped planetary gear 24 and the gearing region 10 of the sun gear 8. As indicated above, $d_{P1}$ is the standard pitch circle and $d_{bP}$ is the base circle of the first gearing region 26 of the stepped planetary gear 24. $d_S$ is the standard pitch circle and $d_{bS}$ is the base circle of the gearing region 10 of the sun gear 8. $d_{wP-S}$ is the operating pitch circle of the engagement between the first gearing region 26 and the gearing region 10 of the sun gear 8 that extends through the pitch point C. As is also apparent here, the gearings are configured such that the pitch point C falls approximately in the center of the path of contact AE; a so-called low-loss gearing is thus also realized here.

Figure 7:
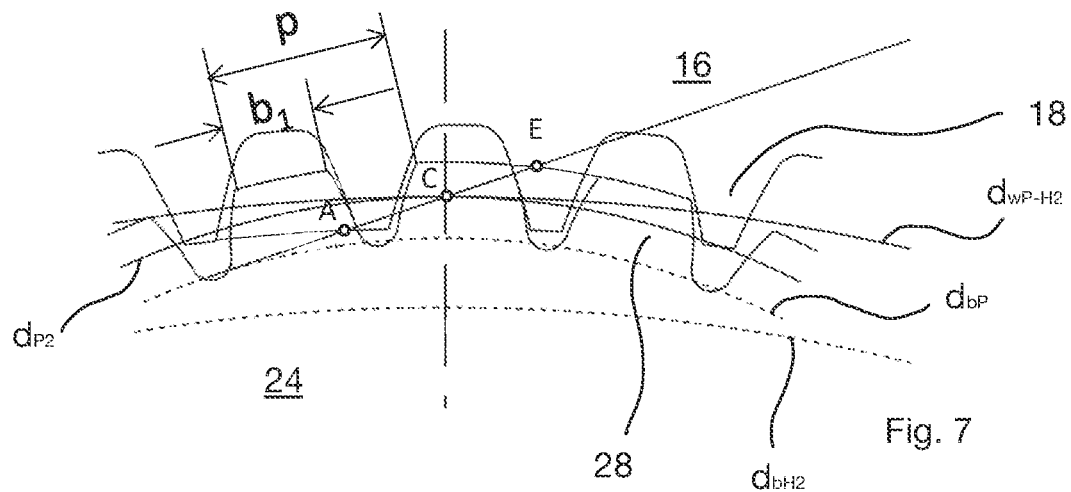
FIG. 7 shows a schematic side view of the gearing between the second ring gear and the second gearing region of the stepped planetary gear of the planetary transmission according to the first embodiment.

FIG. 7 shows the gear pairing or the engagement between the inner gearing 18 of the second ring gear 16 and the second gearing region 28 of the stepped planetary gear 24. $d_{P2}$ is the standard pitch circle and $d_{bP}$ is the base circle of the second gearing region 28 of the stepped planetary gear 24. Due to the identical gearing geometry, the base circle of the second gearing region 28 is equal to that of the first gearing region 26, whereas the respective standard pitch circles differ from each other. $D_{H2}$ is the standard pitch circle and $d_{bH2}$ is the base circle of the inner gearing 18 of the second ring gear 16. $d_{wP-H2}$ is the operating pitch circle of the engagement between the second gearing region 28 and the inner gearing 18 of the second ring gear 16 that extends through the pitch point C. A low-loss gearing is also realized here, i.e., the gearings are configured such that the pitch point falls approximately in the center of the path of contact AE. In contrast to the engagement between the first gearing region 26 and the inner gearing 14 of the first ring gear 12, the operating pressure angle is very small. The tooth heads of the second gearing region 28 of the stepped planetary gear 24 are very wide (blunt), and the root circle is only slightly larger than the base circle $db_1$.

Figure 8:
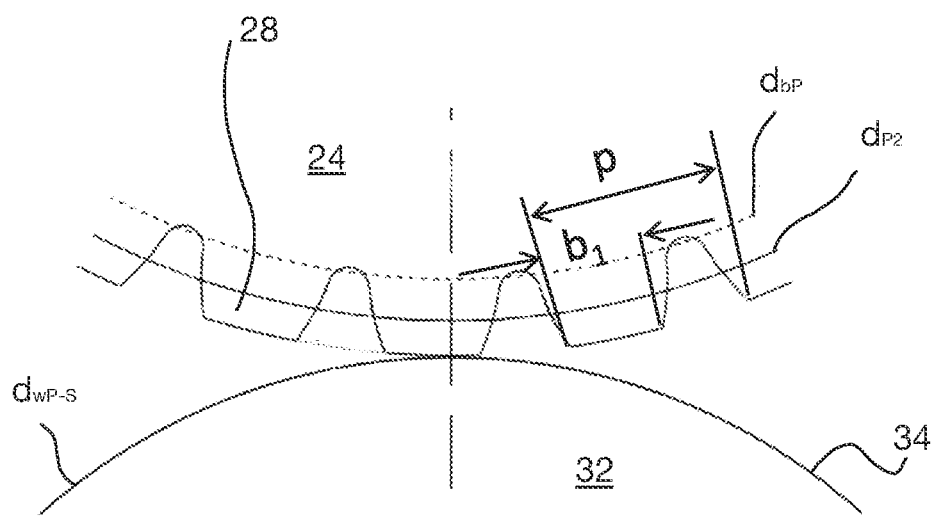
FIG. 8 shows a schematic side view of the supporting of the second gearing region of the stepped planetary gear on the support region of the input shaft of the planetary transmission according to the first embodiment.

FIG. 8 shows the supporting of the second gearing region 28 of the stepped planetary gear 24 on the outer circumferential surface 34 of the support region 32. The diameter of the outer circumferential surface 34 corresponds to that of the operating pitch circle $d_{wP-S}$ of the engagement between the first gearing region 26 and the gearing region 10 of the sun gear 8.

Figure 9:
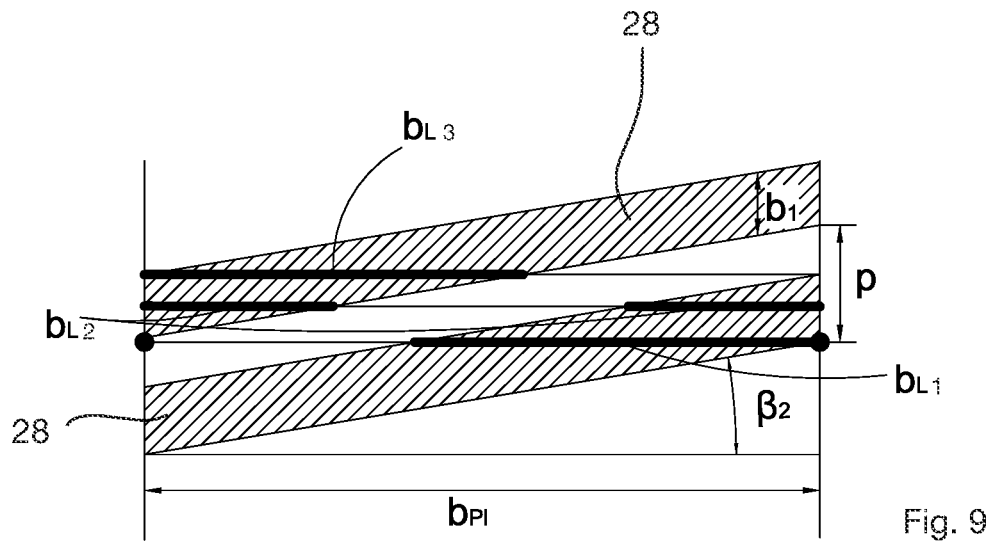
FIG. 9 shows a schematic view of the contact regions between the second gearing region of the stepped planetary gear and the support region of the input shaft in various rotational positions of the stepped planetary gear according to the first embodiment.
Figure 10:
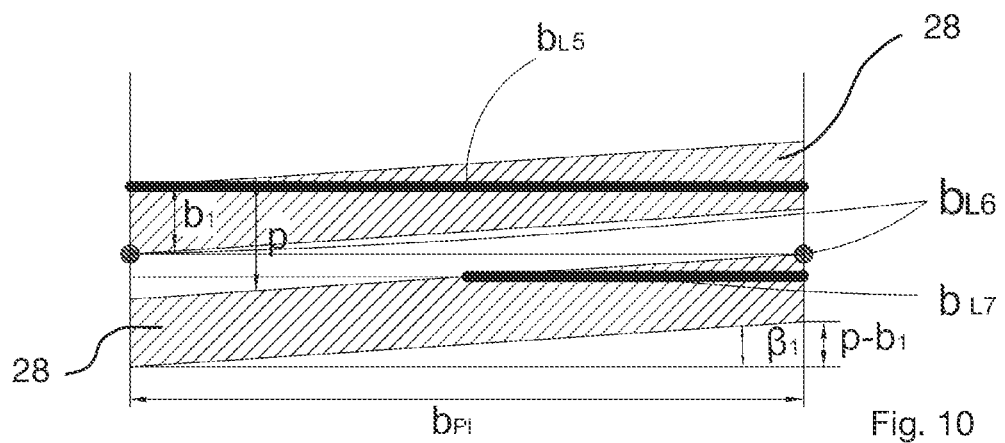
FIG. 10 shows a schematic view of the contact regions between the second gearing region of the stepped planetary gear and the support region of the input shaft in various rotational positions of the stepped planetary gear according to a further embodiment.

FIGS. 9 and 10 show views of the second gearing region 28, in which various possible contact lines $b_L$ are indicated that each mark a region of the gearing region 28 that is contacted by the outer circumferential surface 34 of the support region 32 depending on the rotational position of the stepped planetary gear 24.

For a continuous supporting (bearing) of the second gearing region 28 on the outer circumferential surface 34, in which the axial distance of the rotational axis of the stepped planetary gear 24 and the rotational axis of the support region 32 remains constant during the rotation with simultaneous supporting, it must be ensured that, independent of the (i.e. at every) rotational position of the stepped planetary gear 24, a portion of the tooth of the second gearing region 28, which portion lies on the addendum circle of the second gearing region 28, is in contact with the outer circumferential surface 34 of the cylindrical support region 32. This can only be ensured by the second gearing region 28 being helically toothed with a predetermined geometry. The following characteristic values, which are shown in FIGS. 9 and 10, are also relevant for the design:

$b_{P1}$ width of the gearing of the second gearing region 28 in the direction of the rotational axis
$b_1$ tip width of the teeth of the second gearing region 28
p pitch of the gearing of the second gearing region 28
$b_{eff}$ effective (actual) supporting width between the second gearing region 28 and the outer circumferential surface 34 of the support region 32 (thick lines in FIGS. 9 and 10)
β helix angle of the gearing of the second gearing region 28
$\varepsilon_\beta$ face contact ratio that results from $\varepsilon_\beta = (b_{P1} \times \tan \beta)/p$.

FIG. 9 shows an embodiment in which the gearing is configured with a face contact ratio $\varepsilon_\beta = 1$. If this is the case, the effective supporting width $b_{eff}$ can be determined from the formula $b_{eff} = (b_1/p) \times b_{P1}$. In the case of $\varepsilon_\beta = 1$, the effective supporting width $b_{eff}$ is constant, i.e., is independent of the rotational position of the stepped planetary gear 24. FIG. 9 shows, by way of example, various effective supporting widths $b_{L1}$, $b_{L2}$, $b_{L3}$. As is clearly visible, the various effective supporting widths $b_{L1}$, $b_{L2}$, $b_{L3}$ have identical lengths that result from the above formula.

FIG. 10 shows an embodiment in which the gearing is configured with a face contact ratio $\varepsilon_\beta < 1$. FIG. 10 shows, by way of example, the effective supporting widths $b_{L5}$, $b_{L6}$, $b_{L7}$ for this case. As can clearly be seen, the effective supporting widths in this case are very different, in a manner that depends on the rotational position of the stepped planetary gear 24. In particular there are two extremes; thus the effective supporting width $b_{L5}$ corresponds to the width $b_{P1}$ of the gearing, and the effective supporting width $b_{L6}$ only corresponds to two points; a jolting is only just avoided.

Hence, for $\varepsilon_\beta < 1$, no jolting can occur and the axial distances remain constant; therefore, for $\varepsilon_\beta < 1$, the following formula must additionally be fulfilled: $\varepsilon_\beta \geq (p - b_1)/p$.

In the construction of the transmission, the axial and radial forces to be expected are calculated starting from the torque to be transmitted and the desired gear ratio. For example, conventional programs for the calculation of forces in gearings can be used here. Based on this, a designing of the gear steps, and in particular of the supporting (bearing) of the second gearing region 28 on the cylindrical support region 32, is effected. Here, the effective supporting width is considered in the designing, taking into account the maximum permissible Hertzian contact stress in the line or point-shaped contact region between the second gearing region 28 and the cylindrical support region 32.

For the case that the outer diameter of the cylindrical support region 32 matches the operating pitch circle diameter of the gearing between the sun gear 8 and the first gearing region 26, the values of rolling-element bearings can be assumed to be the permissible Hertzian stresses. On the other hand, if the outer diameter of the cylindrical support region 32 does not match the operating pitch circle diameter of the gearing between the sun gear 8 and the first gearing region 26, then sliding occurs and the losses are considerably higher, so that the allowable values for the Hertzian stresses are lower and should orient toward the values for gears.

Depending on the concrete design, the assembling of the planetary transmission can occur in different ways. The housing is preferably configured such that the transmission is easily repairable and serviceable.

The transmission can be used in fields in which a high gear ratio with low backlash is required. For example, the transmission can be used in the robotics sector.

Figure 11:
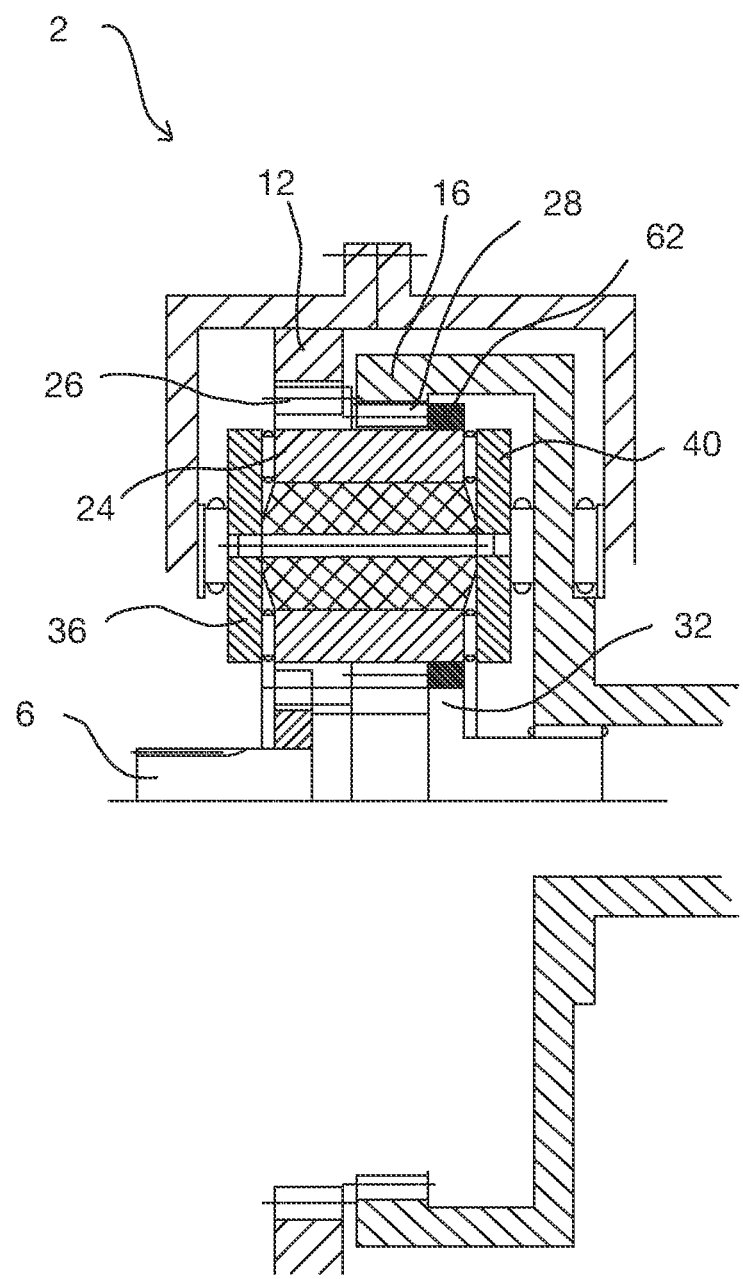
FIG. 11 shows a schematic partial cross-sectional view of a second planetary transmission according to the present teachings.

Another planetary transmission 2 is shown in FIG. 11. The planetary transmission in FIG. 11 corresponds to that shown in FIG. 1 according to the first embodiment, with the exception of the following features: the first gearing region 26 and the second gearing region 28 of the stepped planetary gear 24 are straight-toothed. The gearings of the sun gear 8 and of the first ring gear 12 and of the second ring gear 16 are correspondingly configured in a straight toothed manner. The second gearing region 26 is configured to be axially lengthened rightward. A sleeve component 62 is pressed onto the right end of the second gearing region 28. In this embodiment the sleeve component 62 is configured on the inner side with an interference fit complementary to the gearing of the second gearing region 28. On the outer circumferential side, the sleeve component 62 is configured in a cylindrical manner. In a cross-sectional view perpendicular to the second axis X2, the outer circumferential surface is circular. The outer-circumferential surface of the sleeve component 62 is supported radially on the cylindrical support region 32 that is provided on the first shaft 6. The outer-circumferential surface of the sleeve component 62 has an outer diameter that corresponds to the operating pitch circle diameter of the gearing between the sun gear 8 and the first gearing region 26. In the operation of the transmission, the outer-circumferential surface of the sleeve component 62 therefore rolls on the cylindrical support region 32 without sliding. The portion of the gearing of the second gearing region 28, with which the sleeve component 62 is not in engagement, meshes with the inner gearing of the second ring gear 16. The first shaft 6 is spaced radially with respect to the second gearing region 28 within the meshing region of the second gearing region 28.

Figure 12:
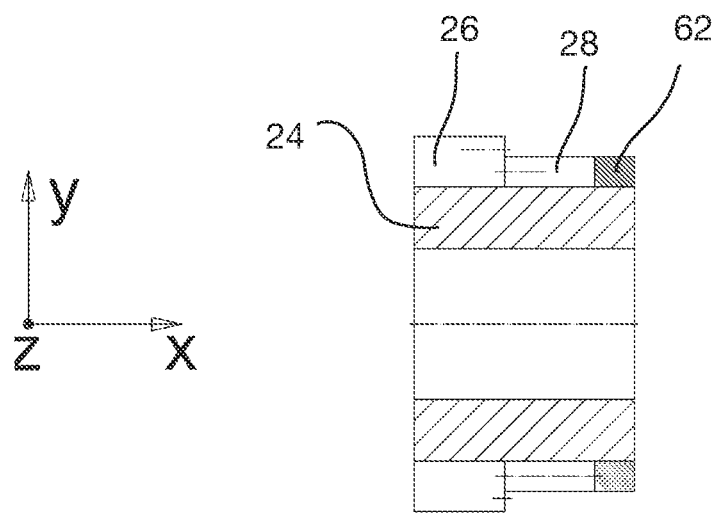
FIG. 12 shows a schematic partial cross-sectional view of the stepped planetary gear of the planetary transmission shown in FIG. 11.

FIG. 12 shows a cross-sectional view of the stepped planetary gear 24 extracted from FIG. 11 with the pressed-on sleeve component 62.

The forces acting on the stepped planetary gear 24 shown in FIG. 11 differ from those according to the first embodiment as follows: since only straight gearings are used in this embodiment, the axial forces acting in the gearings are omitted. Therefore the tilting moments about the y- and the z-axis are exclusively supported axially in (by) the support disks 36, 40.

In another non-depicted embodiment, the first gearing region can be configured in a straight-toothed manner, and the second gearing region can be configured in a helically toothed manner. Alternatively both gearing regions can be configured in a helically toothed manner.

In another example of the present disclosure, the second gearing region can be straight-toothed, and the first gearing region can be straight- or helically toothed.

It is self-evident that the specified embodiments can be modified or altered in various ways without departing from the gist of the present disclosure. For example, the stepped planetary gear can be replaced by two planetary gears, which are connected to each other in a torque-proof manner to rotate together, without requiring further adjustments. For this purpose, the planetary gears, which are connected together, are supported on a common planetary shaft that is held in turn in bores in the support disks.

Instead of a planetary shaft for connecting to the support disks, bearing journals, which protrude in the axial direction and are disposed coaxial to the second axis, can be provided on the stepped planetary gear or the planetary gears, which are connected to each other.

Instead of the coupling of the stepped planetary gear and of the support disks by the planetary shaft or the bearing journals, a radial supporting of the support disks can be achieved by recessed bearing races, which are provided in the support disks, for the first or second thrust bearing.

Figure 3:
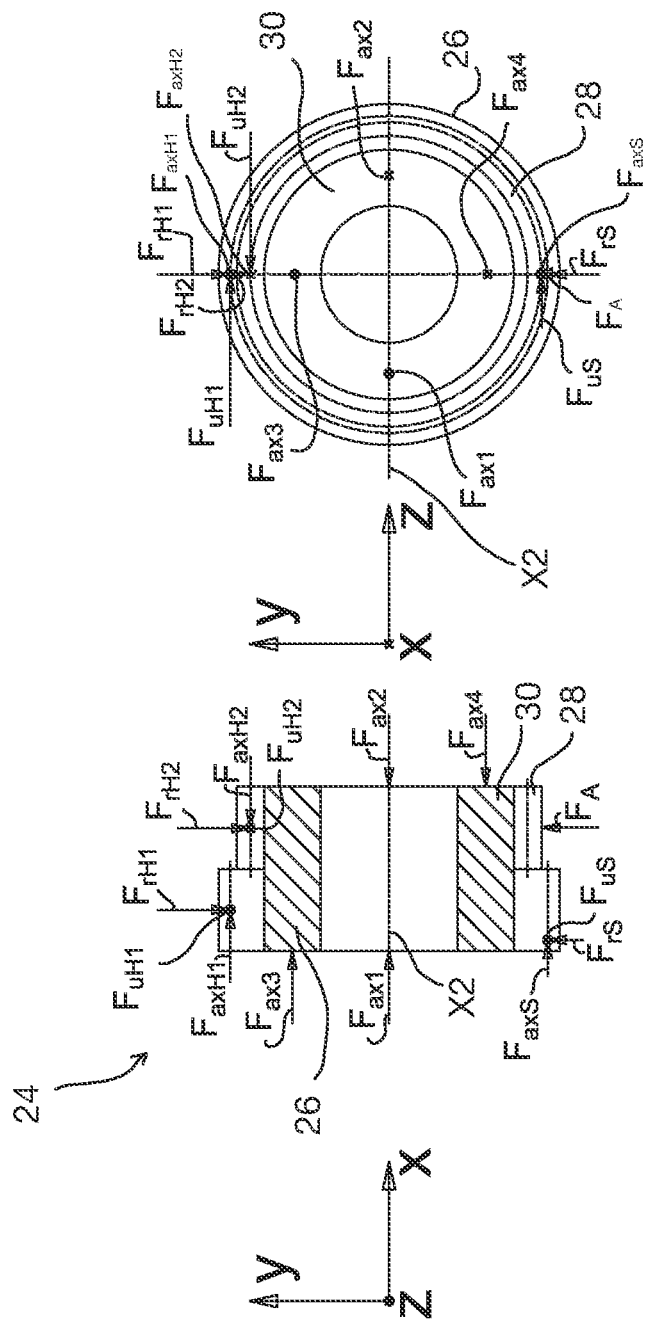

In a particularly preferred embodiment, as provided above, the stepped planetary gear is configured with continuous gearing. For this purpose, in a first step the entire stepped planetary gear is configured with a single continuous helical gearing that will later correspond to the gearing in the first gearing region. Subsequently, the gearing in the second gearing region is downsized by an additional process step (lathe machining, etc.), in which the pitch or tooth distance remain the same. In particular, the addendum circle of the gearing of the then-formed second gearing region is smaller than the addendum circle of the gearing of the first gearing region. Conversely, the head width of the gearing of the then-formed second gearing region is greater than the head width of the gearing of the first gearing region. The second ring gear includes a corresponding gearing adapted thereto. FIGS. 5 to 8 show the described differences. However, the above-described "additional process step" can also be effected before the gear cutting, i.e., the blank has a removed outer diameter and only then is the gear cut. The result is the same as depicted in FIG. 3.

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims. It is explicitly stated that all range specifications or specifications of groups of units disclose every possible intermediate value or subgroup of units for the purpose of the original disclosure as well as for the purpose of limiting the claimed invention, in particular also as the limit of a range specification.

REFERENCE NUMBER LIST

2 Planetary transmission
4 Housing
6 First shaft
8 Sun gear
10 Gearing region (segment) of the sun gear
12 First ring gear
14 Inner gearing of the first ring gear
16 Second ring gear
18 Inner gearing of the second ring gear
20 Radial extension region (segment) of the second ring gear
22 Second shaft
24 Stepped planetary gear
26 First gearing region (segment) of the stepped planetary gear
28 Second gearing region (segment) of the stepped planetary gear
30 Base body of the stepped planetary gear
32 Support region
34 Outer circumferential surface of the support region
36 First support disk
38 First thrust bearing
40 Second support disk
42 Second thrust bearing
44 Third thrust bearing
46 First radially extending housing wall segment
48 Fourth thrust bearing
50 Second radially extending housing wall segment
52 Fifth thrust bearing
54 First radial bearing
55 End segment of the first shaft
56 Shaft carrier body
58 Recessed segment of the first shaft
60 Planetary shaft
62 Sleeve component
X1 First axis
X2 Second axis
$b_{P1}$ Width of the gearing of the second gearing region (segment)
$b_1$ Head width of the teeth of the second gearing region (segment)
p Pitch of the gearing of the second gearing region (segment)
$b_{eff}$ Effective (actual) supporting width between the second gearing region (segment) and the outer-circumferential surface of the support region (segment)
β Helical angle of the gearing of the second gearing region (segment)
$F_{rH1}$ Radial force from the gearing of the first gearing region—first ring gear
$F_{rH2}$ Radial force from the gearing of the second gearing region—second ring gear
$F_{rS}$ Radial force from the gearing of the sun gear—first gearing region
$F_{uH1}$ Circumferential force from the gearing of the first gearing region—first ring gear
$F_{uH2}$ Circumferential force from the gearing of the second gearing region—second ring gear $F_{uS}$ Circumferential force from the gearing of the sun gear—first gearing region $F_{axS}$ Axial force from the gearing of the sun gear—first gearing region $F_{axH1}$ Axial force from the gearing of the first gearing region—first ring gear $F_{axH2}$ Axial force from the gearing of the second gearing region—second ring gear $F_{ax1}$ First axial force for the supporting of the tilting moment about the y-axis $F_{ax2}$ Second axial force for the supporting of the tilting moment about the y-axis $F_{ax3}$ First axial force for the supporting of the tilting moment about the z-axis $F_{ax4}$ Second axial force for the supporting of the tilting moment about the z-axis $F_A$ Radial force of the support point 34

The invention claimed is:

1. A planetary transmission, including:
a housing,
a first shaft having an externally toothed sun gear and being supported in the housing so as to be rotatable about a first axis,
a first ring gear that is provided coaxial to the first shaft and is not rotatable relative to the housing, and
a second ring gear supported in the housing so as to be rotatable about the first axis,
wherein the planetary transmission includes either:
a stepped planetary gear that is provided radially between the first shaft and the first and second ring gears, and that includes a first gearing region that meshes with the sun gear and the first ring gear, and a second gearing region that meshes with the second ring gear, or
a first planetary gear that is provided radially between the first shaft and the first ring gear, and that includes a first gearing region that meshes with the sun gear and the first ring gear, and a second planetary gear that is provided radially between the first shaft and the second ring gear, and is torque-proof and coaxially connected to the first planetary gear to rotate therewith, the second planetary gear including a second gearing region that meshes with the second ring gear, and wherein:

on the first shaft, a cylindrical support region is provided coaxial to the first shaft, the stepped planetary gear or the planetary gears, which are connected to each other, are radially supported on the cylindrical support region, the second gearing region is helically geared and has an addendum circle, the stepped planetary gear or the planetary gears, which are connected to each other, is or are supported on the cylindrical support region by the outer circumferential surface of the second gearing region, the second gearing region lying on the addendum circle of the second gearing region.

2. The planetary transmission according to claim 1, wherein the outer diameter of the cylindrical support region matches the operating pitch circle diameter of the sun gear in the gearing between the sun gear and the first gearing region.

3. The planetary transmission according to claim 1, wherein the second gearing region has a face contact ratio ($\varepsilon_\beta$) that is greater than or equal to one.

4. The planetary transmission according to claim 1, wherein the face contact ratio of the second gearing region is greater than or equal to the ratio of the pitch (p) minus the tooth head width ($b_1$) of the second gearing region to the pitch (p) of the second gearing region.

5. The planetary transmission according to claim 4, wherein the first gearing region and the second gearing region of the stepped planetary gear are formed from a continuous gearing.

6. The planetary transmission according to claim 1, wherein the planetary transmission is configured such that tilting moments perpendicular to the rotational axis of the stepped planetary gear or of the planetary gears, which are connected to each other, which tilting moments act on the stepped planetary gear or on the planetary gears, which are connected to each other, in operation due to the torque transmission, are supported, by axially supporting of the stepped planetary gear or of the planetary gears, which are connected to each other.

7. The planetary transmission according to claim 1, further including:

a first support disk provided on a first side of the first gearing region of the stepped planetary gear or on a first side of the first planetary gear, the first support disk being coaxial to and rotatable about the first axis and being configured to axially support the stepped planetary gear or the planetary gears, which are connected to each other, and/or a second support disk provided on a second side of the second gearing region of the stepped planetary gear or on a second side of the second planetary gear, the second support disk being coaxial to and rotatable about the first axis and being configured to axially support the stepped planetary gear or of the planetary gears, which are connected to each other.

8. The planetary transmission according to claim 7, wherein:

a first thrust bearing is provided coaxial to a planetary rotational axis between the first support disk and the stepped planetary gear or the first planetary gear for axial support; or the stepped planetary gear or the first planetary gear is slidingly axially supported directly on the first support disk, and/or a second thrust bearing is provided coaxial to the planetary rotational axis between the second support disk and the stepped planetary gear or the second planetary gear for axial support; or the stepped planetary gear or the second planetary gear is slidingly axially supported directly on the second support disk.

9. The planetary transmission according to claim 7, wherein, between the first support disk and the housing, a third thrust bearing is provided coaxial to the first axis; or the first support disk is slidingly axially supported on the housing.

10. The planetary transmission according to claim 9, further including:

a second shaft connected to the second ring gear in a torque-proof manner so as to rotate with the second ring gear about the first axis, wherein:

the second ring gear is connected to the second shaft in a torque-proof manner to rotate therewith via a radial extension region of the second ring gear, or a connecting region extending radially from the second ring gear to the second shaft is provided.

11. The planetary transmission according to claim 10, wherein:

the second support disk is provided between (a) the stepped planetary gear or the second planetary gear and (b) the radial extension region of the second ring gear or the connecting region extending radially from the second ring gear to the second shaft, and between the second support disk and the radial extension region of the second ring gear or the radially extending connecting region, a fourth thrust bearing is provided coaxial to the first axis, or the second support disk is slidingly axially supported on the radial extension region of the second ring gear or the radially extending connecting region.

12. The planetary transmission according to claim 11, wherein the second ring gear is supported in the axial direction by a fifth thrust bearing that is provided between the housing and one of (i) the radial extension region of the second ring gear or (ii) the connecting region extending radially from the second ring gear to the second shaft the second ring gear being coaxial to the first axis.

13. The planetary transmission according to claim 10, wherein the second shaft is supported in the radial direction by a radial bearing that is provided radially between the first shaft and one of (i) an axially extending inner-circumferential surface of the second shaft, which is configured in a hollow manner, or (ii) an axial connecting region from the second ring gear to the second shaft.

14. The planetary transmission according to claim 8, wherein at least one of the thrust bearings is a needle roller bearing or a roller bearing.

15. The planetary transmission according to claim 8, wherein all of the thrust bearings are configured as rolling-element bearings.

16. The planetary transmission according to claim 7, wherein the planetary rotational axis is coupled with at least one of the support disks such that the at least one support disk rotates about the first axis, while the stepped planetary gear or the first and second planetary gears revolve(s) about the first axis.

17. The planetary transmission according to claim 1, wherein no planet carrier is provided that radially supports the stepped planetary gear or the planetary gears, which are connected to each other, on the first shaft or the second shaft.

18. The planetary transmission according to claim 1, wherein a plurality of stepped planetary gears or a plurality of the planetary gears, which are connected to each other, is provided.

19. The planetary transmission according to claim 1, wherein the first gearing region and the second gearing region of the stepped planetary gear are formed from a continuous gearing.

20. The planetary transmission according to claim 1, further including:
  a second shaft fixedly connected to the second ring gear so as to rotate with the second ring gear about the first axis,
  wherein:
  the second ring gear is fixedly connected to the second shaft via a radial extension region of the second ring gear or via a connecting region that extends radially from the second ring gear to the second shaft.

21. The planetary transmission according to claim 20, wherein the second shaft is supported in the radial direction by a radial bearing that is provided radially between the first shaft and one of (i) an axially extending inner-circumferential surface of the second shaft, which is configured in a hollow manner, or (ii) an axial connecting segment from the second ring gear to the second shaft.

* * * * *

UNITED STATES PATENT AND TRADEMARK OFFICE
CERTIFICATE OF CORRECTION

| | | |
|---|---|---|
| PATENT NO. | : 11,781,619 B2 | Page 1 of 1 |
| APPLICATION NO. | : 17/918952 | |
| DATED | : October 10, 2023 | |
| INVENTOR(S) | : Bernd-Robert Höhn | |

It is certified that error appears in the above-identified patent and that said Letters Patent is hereby corrected as shown below:

In the Claims

In Claim 9, Column 28, Line 10, replace "claim 7" with "claim 8".

Signed and Sealed this
First Day of October, 2024

Katherine Kelly Vidal
Director of the United States Patent and Trademark Office